(12) United States Patent
Hirade et al.

(10) Patent No.: US 10,519,330 B2
(45) Date of Patent: Dec. 31, 2019

(54) INK, INK ACCOMMODATING UNIT, RECORDING METHOD, RECORDING DEVICE, AND RECORDED MATTER

(71) Applicants: Tomohiro Hirade, Kanagawa (JP); Hisashi Habashi, Kanagawa (JP)

(72) Inventors: Tomohiro Hirade, Kanagawa (JP); Hisashi Habashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/048,831

(22) Filed: Jul. 30, 2018

(65) Prior Publication Data

US 2019/0031897 A1 Jan. 31, 2019

(30) Foreign Application Priority Data

Jul. 31, 2017 (JP) .................................. 2017-148123
Apr. 10, 2018 (JP) .................................. 2018-075606
May 31, 2018 (JP) .................................. 2018-105159

(51) Int. Cl.
| | | |
|---|---|---|
| *C09D 11/322* | (2014.01) | |
| *C09D 11/36* | (2014.01) | |
| *C09D 11/38* | (2014.01) | |
| *C09D 11/033* | (2014.01) | |
| *C09D 11/037* | (2014.01) | |
| *C09D 11/102* | (2014.01) | |
| *C09D 11/104* | (2014.01) | |
| *C09D 11/106* | (2014.01) | |
| *C09D 11/107* | (2014.01) | |
| *C08K 7/26* | (2006.01) | |
| *B41M 5/00* | (2006.01) | |

(Continued)

(52) U.S. Cl.
CPC .......... *C09D 11/322* (2013.01); *B41M 5/0017* (2013.01); *B41M 5/0023* (2013.01); *B41M 5/502* (2013.01); *B41M 7/009* (2013.01); *C09D 11/033* (2013.01); *C09D 11/037* (2013.01); *C09D 11/102* (2013.01); *C09D 11/104* (2013.01); *C09D 11/106* (2013.01); *C09D 11/107* (2013.01); *C09D 11/36* (2013.01); *C09D 11/38* (2013.01)

(58) Field of Classification Search
None
See application file for complete search history.

(56) References Cited

U.S. PATENT DOCUMENTS 7,810,919 B2 * 10/2010 Kojima .................. C09D 11/30
106/31.13
9,593,249 B2 * 3/2017 Okada .................... C09D 11/32
(Continued)

FOREIGN PATENT DOCUMENTS

JP 2010-266672 11/2010
JP 2012-007089 1/2012
(Continued)

OTHER PUBLICATIONS

English translation of JP 2012/007089, Jan. 2012; 30 pages.*
(Continued)

*Primary Examiner* — Helene Klemanski
(74) *Attorney, Agent, or Firm* — Oblon, McClelland, Maier & Neustadt, L.L.P.

(57) ABSTRACT

An ink contains a volatile solvent, a pigment including an inorganic hollow particle having a spherical form, and a resin particle.

20 Claims, 2 Drawing Sheets

(51) Int. Cl.
*B41M 5/50* (2006.01)
*B41M 7/00* (2006.01)

(56) References Cited

U.S. PATENT DOCUMENTS

| | | |
|---|---|---|
| 2015/0184010 A1 | 7/2015 | Okada et al. |
| 2016/0152845 A1 | 6/2016 | Okada et al. |
| 2016/0347962 A1 | 12/2016 | Okada et al. |
| 2017/0247561 A1* | 8/2017 | Nakagawa ........... B41J 11/0015 |
| 2017/0349772 A1 | 12/2017 | Hirade et al. |
| 2017/0355868 A1* | 12/2017 | Saiga .................... C09D 11/54 |
| 2018/0265728 A1* | 9/2018 | Hanazawa ............. C09D 11/52 |

FOREIGN PATENT DOCUMENTS

| | | |
|---|---|---|
| JP | 2014-051401 | 3/2014 |
| JP | 2015/174868 | * 10/2015 |
| JP | 2016-150880 | 8/2016 |
| JP | 2018-039936 | 3/2018 |

OTHER PUBLICATIONS

English translation of JP 2014/051401, Mar. 2014; 11 pages.*
English translation of JP 2016/150880, Aug. 2016; 28 pages.*
English translation of JP 2010/266672, Nov. 2010; 24 pages.*
English translation of JP 2018/039936, Mar. 15, 2018; 42 pages.*
English translation of JP 2015/174868, Oct. 2015; 49 pages.*

* cited by examiner

INK, INK ACCOMMODATING UNIT, RECORDING METHOD, RECORDING DEVICE, AND RECORDED MATTER

CROSS-REFERENCE TO RELATED APPLICATIONS

This patent application is based on and claims priority pursuant to 35 U.S.C. § 119 to Japanese Patent Application Nos. 2017-148123, 2018-075606, and 2018-105159, filed on Jul. 31, 2017, Apr. 10, 2018, and May 31, 2018, respectively, in the Japan Patent Office, the entire disclosures of which are hereby incorporated by reference herein.

BACKGROUND

Technical Field

The present invention relates to an ink, an ink container, an inkjet recording method, an inkjet recording device, and recorded matter.

Description of the Related Art

Since inkjet printers are relatively quiet, enjoy low running costs, and are capable of easily printing color images, they are now widely used at home as an output device of digital signals.

In recent years, such inkjet technologies have been appealing in business fields of, for example, display, posters, and signboards in addition to home use.

However, recording media for industrial use are not limited to paper, but can include anything from paper to transparent articles to colored articles. To represent white on such recording media or color it with color ink, it is necessary to conceal transparency of a recording medium or sufficiently conceal the color of a recording medium with ink. For this reason, white ink is used to cover such transparent or colored media with white. In addition, when color ink is used, in order to use the same color ink for use in typical images, the surface of a recording medium is printed with white ink as backdrop for the color ink to enhance coloring.

As the pigment for such white ink, titanium dioxide is popular, which is excellent white pigment in terms of concealing property and coloring property. To demonstrate good concealing property using titanium dioxide, dispersing particles in a particle size range of from 200 to 400 mn is required to scatter visible light. However, titanium oxide tends to settle out because of its great specific gravity in comparison with that of an ink medium. Moreover, titanium dioxide settles out faster in low viscous ink such as aqueous ink and solvent ink. Furthermore, titanium dioxide that has settled out takes the closest packing structure, so that re-dispersion of titanium dioxide is difficult.

To deal with such issues, ink using hollow particles have been developed. Since an ink medium is present in the hollow portion of hollow particles in ink, specific gravity thereof decreases in appearance and the hollow particle does not easily settle out. Moreover, concealment by hollow particles is obtained by utilizing the difference of refractive index between hollow shells and the hollow portion from which the ink medium is drawn out after applied film is dried.

For example, ink including organic particles having a hollow structure and inorganic particles having a hollow structure has been proposed.

SUMMARY

According to the present invention, provided is an improved ink which contains a volatile solvent, a pigment, and a resin particle, wherein the pigment contains an inorganic hollow particle having a spherical form.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
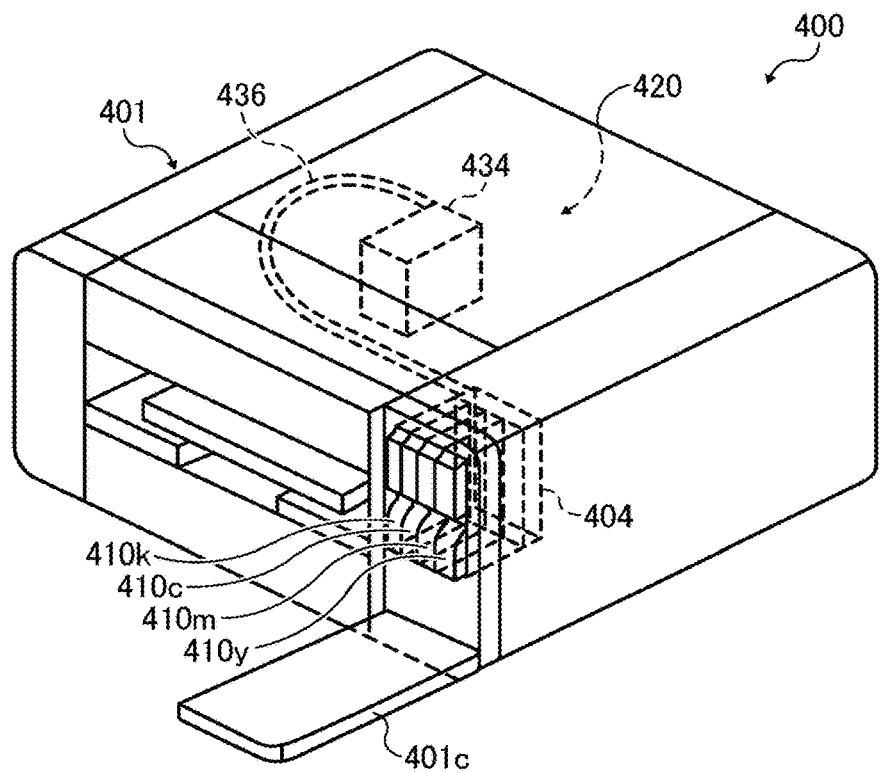
FIG. 1 is a diagram illustrating an example of the recording device using the ink of an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The present disclosure relates to the ink of the following 1 and also includes the following 2 to 16 as embodiments.
1. An ink contains a volatile solvent, a pigment including an inorganic hollow particle having a spherical form, and a resin particle.
2. The ink according to 1 mentioned above, wherein the inorganic hollow particle has a number average primary particle diameter of from 200 to 550 nm.
3. The ink according to 1 or 2 mentioned above, wherein the inorganic hollow particle has an outer shell having a thickness of from 15 to 50 nm.
4. The ink according to any one of 1 to 3 mentioned above, wherein the inorganic hollow particle accounts for 3 to 10 percent by mass of the ink.
5. The ink according to any one of 1 to 4 mentioned above, wherein the volatile solvent contains a non-polymerizable solvent having a boiling point of 260 degrees C. or lower.

6. The ink according to any one of 1 to 5 mentioned above, wherein the volatile solvent contains water.
7. The ink according to 6 mentioned above, wherein the volatile solvent further contains a water-soluble organic solvent.
8. The ink according to any one of 1 to 5 mentioned above, wherein the volatile solvent contains an organic solvent.
9. The ink according to any one of 1 to 8 mentioned above, wherein the absolute lightness difference $|\Delta L^*|$ between L*50° C. and L*100° C. of a solid image of 50 mm×50 mm formed on a polyethylene terephthalate (PET) film satisfies the following relation:

$$|\Delta L^*|=|L^*100° C.-L^*50° C.|\leq 10,$$

where L*50° C. and L*100° C. respectively represent a lightness L* after the solid image is dried in a hemathermal tank for one hour at 50 degrees C. and 100 degrees C.

11. An ink accommodating unit includes the ink of any one of 1 to 10 mentioned above and a container to accommodate the ink of any one of 1 to 10 mentioned above.
12. A recording method includes jetting the ink of any one of 1 to 10 mentioned above to form an image on a recording medium and drying the image at a temperature range of from 50 to 200 degrees C.
13. A recording method includes attaching a liquid composition for surface treatment and the ink of any one of 1 to 10 mentioned above to a recording medium, wherein the liquid composition contains a multivalent metal salt.
14. The recording method according to 13 mentioned above, wherein the liquid composition further contains a resin particle containing at least one member selected from the group consisting of a polyolefin resin, a polyvinyl acetate resin, a polyvinyl chloride resin, a urethane resin, a styrene butadiene resin, and copolymers thereof, wherein the multivalent metal salt contains at least one member selected from the group consisting a calcium salt, a magnesium salt, a nickel salt, and an aluminum salt.
15. A recording device includes the ink accommodating unit of 11 mentioned above and a discharging head to discharge ink.
16. Recorded matter includes a recording medium including a print layer containing a resin and a spherical inorganic hollow particle.

Ink

The ink of the present disclosure contains a volatile solvent, a pigment, a resin particle, and other optional components. The pigment is a spherical inorganic hollow particle. The ink of the present disclosure can be applied to aqueous ink containing water or water and a water-soluble organic solvent as the volatile solvent or a solvent ink containing an organic solvent as the volatile solvent. Excluding the volatile solvents, the aqueous ink and the solvent ink share almost all the components in common.

Organic particles having typical hollow structures are not chemical resistant. Depending on a solvent highly soluble in an ink medium or drying conditions after recording, the organic particle cannot maintain the hollow structure and becomes transparent, failing to obtain desired concealing property. In addition, it is not possible to disperse inorganic particles having a typical hollow structure into small particle diameters, so that the inorganic particles inevitably settle out. Moreover, the present inventors have found that when particles are secondary agglomeration having irregular forms, particle flowability deteriorates, which leads to poor discharging performance and also it is possible to provide ink having high level of dispersion stability and dischargeability and excellent concealing property when spherical inorganic hollow particles are used.

That is, due to the spherical inorganic hollow particles, the ink of the present disclosure can obtain both high level of dispersion stability and discharging stability and excellent concealing property.

Pigment

Inorganic hollow particles are used as the pigment.

The inorganic hollow particle has no specific limit and is suitably selected to a particular application. Specific examples include, but are not limited to, oxides, nitrides, oxynitride, etc. of titanium, silicon, aluminum, zirconium, strontium, etc. Of these, in terms of concealing property, titanium dioxide (hereinafter also referred to as titanium oxide) is preferable.

As the inorganic hollow particle, silicon oxide is also usable because scattering between the shell corresponding to the outer shell of the hollow particle and the hollow portion is obtained in addition to scattering at the surface of the particle. In addition, in terms of settling out in ink, it is preferable to use silicon oxide having a small specific gravity as the inorganic hollow particle.

To secure flowability of the particle in ink, the form of the inorganic hollow particle is required to be spherical. In the present disclosure, the particle form of the inorganic hollow particle being spherical means that the average circularity is 0.93 or higher. To enhance ink discharging performance, it is preferable to use a spherical inorganic hollow particle having an average circularity of 0.95 or higher. The particle form being spherical contributes to improvement of flowability in ink, thereby enhancing ink dischargeability.

The inorganic hollow particle is observed in the following manner to obtain the particle form and the average circularity. Using a transmission electron microscope (JEM-2100F, manufactured by JEOL Ltd.), images of the inorganic hollow particle is taken selecting an arbitrary magnifying power. The thus-obtained TEM image is subject to image analysis utilizing image analysis software to calculate the diameter corresponding to circle and the perimeter of the inorganic hollow particle (outer diameter of particle). Based on the calculated diameter corresponding to circle and the calculated perimeter, circularity of each of 200 inorganic hollow particles is obtained according to the following relation.

Circularity=(Circumferential length obtained from diameter corresponding to circle)/Perimeter (Circumferential length obtained from diameter corresponding to circle)=(diameter corresponding to circle)×π

Of the circularity of the 200 inorganic hollow particles, the top 5 percent and the bottom 5 percent thereof are removed and the average of the rest of the 90 percent is obtained and determined as the average circularity.

The method of controlling the particle form of the inorganic hollow particle is, for example, as follows:

If the inorganic hollow particle is made of silicon oxide, (hereinafter also referred to as hollow silica particle), the manufacturing method is not particularly limited and any known typical method can be used. For example, using an organic compound having an anionic group as the core material in combination with a silica source having a cationic group and a silica source having a cationic group, alkoxysilane is formed on the surface of the core material to obtain silica (for example, JP-2016-150880-A). Thereafter, hollow silica particles are obtained according to a method of dissolving the core material using a solvent.

When using the hollow silica particle, it is desirable not to use dried powder hollow silica particles but a liquid dispersion of hollow silica particles produced during the manufacturing process thereof. Due to the liquid dispersion of the hollow silica particle, strong inter-particle agglomeration at drying can be prevented. Reduction of inter-particle agglomeration at drying contributes to improvement on dispersibility, which obviates the need for applying excessive energy during dispersion. Therefore, damage to particles can be reduced, which prevents deterioration of dischargeability ascribable to deterioration of concealing property and fragmented particles.

When the inorganic hollow particle is composed of titanium dioxide (hereinafter also referred to as titanium hollow particle), the manufacturing method has no particular limit and any known manufacturing method (for example, JP-2014-051401) can be used.

The inorganic hollow particle preferably has a number average primary particle diameter of from 200 to 550 nm and more preferably from 300 to 520 nm. When the number average primary particle diameter is 200 nm or greater, excellent concealing property is obtained utilizing the recording method of attaching a liquid composition for surface treatment and ink to the recording medium, which is described later.

As the primary particle diameter of the inorganic hollow particle increases, concealing property for white color ameliorates but the speed of settling out tends to increase. To enhance concealing property for white color and reduce the increase of the speed of settling out, the primary particle diameter of the inorganic hollow particle is adjusted. When the number average primary particle diameter is 550 nm or less, the speed of settling out in ink can be reduced, thereby obtaining an inorganic hollow particle which has good dispersion stability and does not easily settle out.

The thickness of the outer shell (hereinafter referred to as shell thickness) of the inorganic hollow particle is preferably from 15 to 50 nm. When the shell thickness is 15 nm or greater, it is possible to prevent collapse of the hollow structure caused by energy applied during dispersion process, thereby obtaining good concealing property, and also avoid settling out in ink. Conversely, when the shell thickness is 50 nm or less, specific gravity of the inorganic hollow particle can be maintained small, thereby preventing sedimentation in ink.

Diameters along a certain direction between two parallel lines sandwiching 200 to 500 primary particles with a magnification power of 30,000 are measured utilizing, for example, a transmission electron microscope (JEM-2100F, manufactured by JEOL Ltd.) to calculate the average of the cumulative distribution, from which the number average primary particle diameter and the shell thickness of the inorganic hollow particle are obtained.

The proportion of the inorganic hollow particle is preferably from 3 to 10 percent by mass and more preferably from 5 to 9 percent by mass to the entire ink. When the proportion is 3 percent by mass or greater, concealing property become sufficient. When the proportion is 10 percent by mass or less, concentration of applied film becomes sufficient and good discharging stability can be obtained.

To ameliorate dispersion stability of the inorganic hollow particle in ink, a dispersant may be added. For the dispersant, there is no specific limitation and it can be suitably selected to suit to a particular application. For example, polymer dispersants are preferable. Examples of the polymer dispersant are copolymers of a-olefin-maleic anhydride, styrene-(meth)acrylic copolymer, acrylic block copolymers, water-soluble polyurethane resins, and water-soluble polyester resins. These can be used alone or in combination.

Volatile Solvent

The volatile solvent is preferably a non-polymerizable solvent having no polymerizable functional group and more preferably does not remain in the inorganic hollow particle during drying.

When the volatile solvent is water or water and a water-soluble organic solvent, it can be used as an aqueous ink. When the volatile solvent is an organic solvent, it can be used as a solvent ink.

However, volatile organic compound (VOC) problems draw concerns so that aqueous ink capable of reducing production of VOC is widely desired. VOC is a generic term for organic compounds which easily evaporates into air at ordinary temperatures and pressures. However, in the present disclosure, the volatile solvent is required to volatilize when heated on a recording medium and has a boiling point of 300 degrees C. or lower.

The ink of the present disclosure obtains concealing property utilizing scattering of the shell of inorganic hollow particle and the inside of the hollow portion in addition to scattering at the surface of particles as described above. Therefore, if the ink medium remains inside the inorganic hollow particle after drying the applied film, concealing property of the applied film deteriorates. From this point of view, the boiling point of the volatile solvent is preferably 260 degrees C. or lower.

If the concealing property of applied film is maintained, an ink is also suitable in which the ink medium is contained in the inorganic hollow particle.

Volatile Solvent of Aqueous Ink

As the water for use in the aqueous ink, for example, pure water and ultra pure water such as deionized water, ultra-filtered water, reverse osmosis water, and distilled water are suitable.

Examples of the water-soluble organic solvent for use in the aqueous ink are polyols, ethers such as polyol alkylethers and polyol arylethers, nitrogen-containing heterocyclic compounds, amides, amines, and sulfur-containing compounds.

Water-soluble of the water-soluble organic solvent means that an organic solvent is soluble in water in an amount of 30 percent by mass or greater.

The water-soluble organic solvent has no particular limit and can be suitably selected to suit to a particular application.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanediol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2- imidazolidinone, and E-caprolactam; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, ethylene carbonate, 3-methoxy-3-methyl-1-butanol, N,N-dimethyl-β-buthoxypropionamide (Equamide™ B100, manufactured by Idemitsu Kosan Co., Ltd.), and N,N-dimethyl-β-methoxy propionamide (Equamide™ M100, manufactured by Idemitsu Kosan Co., Ltd.). These can be used alone or in combination.

To serve as a humectant and also impart a good drying property, it is preferable to use a water-soluble organic solvent having a boiling point of 260 degrees C. or lower.

Of these, polyol compounds having eight or more carbon atoms and glycol ether compounds are suitable.

Specific examples of the polyol compound having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether. These can be used alone or in combination.

The proportion of the water-soluble organic solvent in the aqueous ink has no particular limit and can be suitably selected to suit to a particular application.

In terms of the drying property and discharging reliability of the ink, the proportion is preferably 10 to 60 percent by mass and more preferably 20 to 60 percent by mass.

The proportion of water in the aqueous ink is not particularly limited and can be suitably selected to suit to a particular application. For example, in terms of the drying property and discharging reliability of the ink, the proportion is preferably 10 to 90 percent by mass and more preferably 20 to 60 percent by mass.

Volatile Solvent of Solvent Ink

The organic solvent for use in the solvent ink has no particular limit and can be suitably selected to suit to a particular application.

Specific examples include, but are not limited to, glycol monoacetates such as ethylene glycol monomethyleter acetate, ethylene glycol monoethyleter acetate, ethylene glycol monobutyleter acetate, diethylene glycol monomethyleter acetate, diethylene glycol monoethyleter acetate, diethylene glycol monobutylether acetate, propylene glycol monomethylether acetate, dipropylene glycol monomethylether acetate, ethylene glycol monomethylether propionate, ethylene monoethylether propionate, ethylene glycol monobutyleher propionate, diethylene glycol monomethylether propionate, diethylene glycol monoethyl ether propionate, diethylene glycol monobuthylether propionate, propylene glycol monomethylether propionate, dipropylene glycol monomethylether propionate, ethylene glycol monomethyletherbutylate, ethylene glycol monoethyleter butylate, ethylene glycol monobutyl ether butylate, diethylene glycol monomethylether butylate, diethylene glycol monoethyl ether butylate, diethylene glycol monobutylether butylate, propylene glycol monomethylether butylate, and dipropylene glycol monomethylether butylate; glycol diacetates such as ethylene glycol diacetate, diethylene glycol diacetate, propylene glycol diacetate, dipropylene glycol diacetate, ethylene glycol acetate propionate, ethylene glycol acetate butylate, ethylene glycol propionate butylate, ethylene glycol dipropionate, ethylene glycol acetate dibutylate, diethylene glycol acetate pripionate, diethylene glycol acetate butylate, diethylene glycol propionate butylate, diethylenen glycol dipropionate, diethylene glycol acetate dibutylate, propylene glycol acetate propionate, propylene glycol acetate butylate, propylene glycol pripionate butylate, propylene glycol dipropionate, propylene glycol acetate dibutylate, dipropylene glycol acetate propionate, dipropylene glycol acetate butylate, dipropylene glycol propionate butylate, dipropylene glycol dipropionate, and dipropylene glycol acetate dibutylate; glycols such as ethylene glycol, diethylene glycol, triethylene glycol, propylene glycol, and dipropylene glycol; glycol ethers such as ethylene glycol monobutyl ether, propylene glycol monomethylether, propylene glycol monobutylether, propylene glycol monopropyl ether, diethylene glycol monoethylether, diethylene glycol monobutylether, diethylene glycol diethylether, dipropylene glycol monomethylether, dipropylene glycol monoethylether, dipropylene glycol monobutylether, triethylene glycol monomethyl ether, triethylene glycol monoethyl ether, triethylene glycol monobutyl ether, tripropyelen glycol monomethyl ether, and triethylene glycol diethyl ether; lactic acid esters such as methyl lactate, ethyl lactate, propyl lactate, and butyl lactate; and γ-butylolactone. These can be used alone or in combination.

Using the water-soluble organic solvent for use in the aqueous ink, it is possible to be used as a solvent ink.

The proportion of the organic solvent contained in the solvent ink to the total amount of the ink is preferably from 30 to 95 percent by mass, more preferably 30 to 90 percent by mass, and furthermore preferably from 39 to 82 percent by mass.

In addition, the solvent ink preferably contains no water. The solvent ink containing no water can improve stability of dispersion of a pigment, reduce hydrolysis of a solvent, and reduce corrosion of a head. In the solvent ink, the proportion of water is preferably 0.5 percent by mass or less, which is typical adsorption amount.

Resin Particle

The resin in the resin particle has no particular limit and can be suitably selected to suit to a particular application.

Specific examples include, but are not limited to, polyurethane resins, polyester resins, acrylic resins, vinyl acetate resins, styrene resins, butadiene-based resins, styrene-butadiene resins, vinylchloride resins, acrylic styrene resins, and acrylic silicone resins.

These can be used alone or in combination. Of these, in terms of obtaining excellent abrasion resistance, polyurethane resins, polyester resins, acrylic resins, and vinyl chloride resins are preferable.

The resin is preferably dispersible in water in a form of aqueous emulsion and more preferably added to ink in a form of a resin emulsion in which the resin particle is dispersed.

The resin particle dispersible in water in a form of an aqueous emulsion means the form in which water-insoluble resin is substantially and granulously dispersed in water. The resin emulsion in the present disclosure includes articles generally referred to as emulsion, dispersion, latex, or suspension.

It is possible to use a suitably-synthesized resin particle. Alternatively, the resin particle is available on the market.

Due to the resin particle, in addition to scattering on the surface of the inorganic hollow particle and scattering between the shell corresponding to the outer shell of the inorganic hollow particle and the hollow portion present inside, scattering occurs between the resin particle and the hollow portion present inside of the inorganic hollow particle, which enhances concealing property.

50 percent cumulative volume particle diameter ($D_{50}$) of the resin particle is preferably from 10 to 350 nm in terms of storage stability and discharging stability of ink composed of the resin particle.

The proportion of the resin particle is preferably from 2.0 to 7.5 percent by mass and more preferably from 3.0 to 7.0 percent by mass to the total mass of ink. When the proportion is 2.0 percent by mass or greater, concealing property is further improved. When the proportion is 7.5 percent by mass or less, the resin particle is stably maintained.

Additive Agent

Ink may further optionally contain a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain.

These are particularly preferable because they do not easily produce foams

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane.

In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

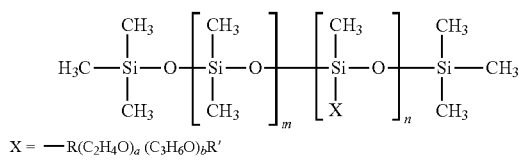

$X = $ ——$R(C_2H_4O)_a (C_3H_6O)_b R'$

In Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

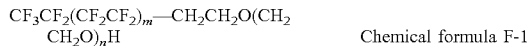

Chemical formula F-1

In the compound represented by Chemical formula F-1, "m" is preferably 0 or an integer of from 1 to 10 and "n" is preferably 0 or an integer of from 1 to 40.

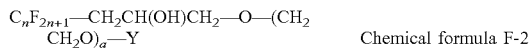

Chemical formula F-2

In the compound represented by the chemical formula F-2, Y represents H or $C_mF_{2m+1}$, where in represents an integer of 1-6, or $CH_2CH(OH)CH_2$—$C_mF_{2m+1}$, where m represents an integer of 4-6, or $C_pH_{2p+1}$, where p is an integer of 1-19, "n" represents an integer of from 1 to 6. "a" represents an integer of from 4 to 14.

As the fluorochemical surfactant, products available on the market may be used.

Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-4005, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3 -one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

The ink of the present disclosure can be manufactured by mixing a volatile solvent, a pigment, a resin particle, and other optional components using a dispersion medium device.

It is possible to use a dispersion device using media such as ball mill, sand mill, and bead mill or a media-free dispersion device. In order to maintain the hollow structure of inorganic hollow particles during dispersion, it is preferable to use a media-free dispersion device.

In the media-free dispersion device, collision of particles against media is avoided, so that it is possible to disperse inorganic hollow particles without breaking the hollow structure. In addition, since contamination ascribable to media does not occur, production of fine powder and coarse powder in the system can be reduced. Moreover, uniformity of the particle size distribution can be improved so that good ink dischargeability can be obtained.

Examples of the media-free dispersion device are dispersion devices or ultrasonic wave dispersion devices utilizing high-speed shearing force by collision or ultrasonic wave or high speed stirring. Of these, dispersion devices utilizing high-speed shearing force or ultrasonic wave dispersion devices are preferable.

A specific example of the dispersion device utilizing high speed shearing force is a NanoVater™ series laboratory machine (CE-008, manufactured by Yoshida kikai co., ltd.).

A specific example of the ultrasonic wave dispersion device is an ultrasonic homogenizer (US-150E, manufactured by NISSEI Corporation).

The temperature of the liquid dispersion during dispersion is preferably from 5 to 60 degrees C. and more preferably from 5 to 50 degrees C.

Properties of the ink are not particularly limited and can be suitably selected to suit to a particular application. For example, viscosity, surface tension, pH, etc., are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of suitable leveling of ink on a recording medium and shortening drying time of the ink.

pH of the ink is preferably from 7 to 12 and more preferably from 8 to 11 in terms of prevention of corrosion of metal material in contact with liquid.

The ink of the present disclosure is attached to a recording medium to obtain white color concealing property. As the attachment amount of the inorganic hollow particle (pigment) increases, the white color concealing property can be enhanced.

When compared under the condition of the same attachment amount of a pigment, inorganic hollow particles such as hollow silica have good white color concealing property relative to titanium oxide.

The film of the printed layer obtained using an ink containing inorganic hollow particles is thicker than the film of the printed layer using an ink containing titanium oxide in spite that the attachment amount of pigment is small. As a result, when compared under the condition of the same attachment amount of a pigment, the inorganic hollow particle is expected to have better white color concealing property than titanium oxide.

The attachment amount of ink according to an inkjet recording method is preferably from 1.5 to 25 g/m². When the attachment of ink is 1.5 g/m² or greater, image density becomes sufficient. When 25 g/m² or less, fixability becomes sufficient.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m² or less from the start of the contact until 30 msec$^{1/2}$ later according to Bristow method.

For example, plastic films such as vinyl chloride resin film, polyethylene terephthalate (PET) film, polypropylene film, polyethylene film, and polycarbonate film are suitably used as the non-permeable substrate.

The recording medium is not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

In the present disclosure, the ink can be used in combination with a liquid composition for surface treatment for a recording medium.

Liquid Composition for Surface Treatment

The liquid composition for surface treatment to subject the surface of a recording medium to treatment contains a multivalent metal salt and preferably a nonionic resin particle and a multivalent metal salt. The liquid composition for surface treatment substantially contains no coloring material. "Substantially containing no coloring material" means that no coloring material is actively added as a component of a liquid composition for surface treatment (hereinafter referred to as simply liquid composition).

To stably store the resin particle under the presence of a polyvalent metal salt for a long period of time, it is preferable to use a nonionic resin particle dispersed by steric hindrance instead of a generally-used charge repulsion type emulsion.

Of the charge repulsion type, an anionic resin particle is found to agglomerate when mixed with a multivalent metal salt. Of those multivalent metal salts, in particular, multivalent metal salts producing trivalent cationic ions at electrolytic dissociation are found to agglomerate on the spot. As a cationic ion has a higher valence, agglomeration is accelerated in a massive amount, thereby easily salting out a dispersion medium.

Cationic resin particles are sufficiently stable when left at room temperatures. However, if these are heated and left to stand as an acceleration test taking into account long-terms stability, the cationic resin particles become thickened.

If the nonionic resin particle is at least one member selected from the group consisting of a polyolefin resin, a polyvinyl acetate resin, a polyvinyl chloride resin, a urethane resin, a styrene butadiene resin, and a copolymer of these resins, particularly excellent laminability is obtained due to strong substrate attachability.

When the multivalent metal salt is at least one member selected from the group consisting of a calcium salt, a magnesium salt, a nickel salt, and an aluminum salt, enhancement of concealing property is expected due to particularly excellent agglomeration effect of ink droplets and the group is preferable in terms of storage stability.

When the multivalent metal salt is an aluminum salt, enhancement of concealing property is expected due to particularly excellent agglomeration effect of ink droplets. In addition, aluminum ion is stable as ion and do not change its valence due to oxidation unlike iron (III) ion.

Nonionic Resin Particle

The nonionic resin particle for use in the present disclosure is dispersible without using a charge.

The nonionic resin particle for use in the present disclosure means a resin particle from which no monomer having an acidic functional group such as carboxyl group or sulfo group or a basic functional group such as amino group is detected by thermal decomposition gas chromatography mass spectroscopy analysis (GC-MS) (for example, GC-17A, manufactured by SHIMADZU CORPORATION) after a solid portion for surface treatment is isolated from the liquid composition for surface treatment by centrifugal separation.

The chemical structure of the resin particle is not particularly limited. Resin particles which can be nonion-dispersed can be used. When the resin particle is at least one member selected from the group consisting of a polyolefin resin, a polyvinyl acetate resin, a polyvinyl chloride resin, a urethane resin, a styrene butadiene resin, and a copolymer of these resins, these are preferable to obtain strong attachability to various substrates. Moreover, a copolymer resin of ethylene-vinyl acetate, a copolymer resin of ethylene-vinyl acetate-vinyl chloride, or an olefin-modified urethane resin is more preferable.

The glass transition temperature of the nonionic resin particle is preferably from −30 to 30 degrees C. and more preferably from −25 to 25 degrees C. When the Tg is −30 degrees C. or higher, resin film becomes sufficiently tough and prior-applied layers become stronger. The range of 30 degrees C. or lower is preferable because filming property of a resin is enhanced and sufficient flexibility is secured, thereby enhancing attachability to substrate.

The proportion of the amount of the nonionic resin particle is preferably from 0.5 to 20 percent by mass to the total amount of the liquid composition for surface treatment.

When the proportion is 0.5 percent by mass or more, the resin sufficiently covers a substrate, thereby enhancing attachability. When 20 percent by mass or lower, attachability does not deteriorate because layer thickness it not excessively thick.

Multivalent Metal Salt

Multivalent metal salts quickly agglomerate a coloring material in ink after ink droplets land on a recording medium and enhance coloring property.

Examples are, but are not limited to, salts (multi-valent metal salts) of titanium, chromium, copper, cobalt, strontium, barium, iron, aluminum, calcium, magnesium, or nickel.

Of these multi-valent metal salts, at least one member selected from the group consisting of calcium salts, magnesium salts, nickel salts, aluminum salts is preferable to effectively agglomerate pigments. Alkali earth metal salts such as calcium salts or magnesium salts producing divalent cationic ions due to electrolytic dissociation are more preferable.

In addition, metal salts such as aluminum or iron that produce trivalent cationic ions due to electrolytic dissociation are preferable and aluminum salts are more preferable.

In particular, when the multivalent metal salt is a calcium salt or an aluminum salt, reaction liquid is more stabilized.

Specific examples include, but are not limited to, calcium carbonate, calcium nitride, calcium chloride, calcium acetate, calcium sulfate, magnesium chloride, magnesium acetate, magnesium sulfate, nickel chloride, barium sulfate, zinc sulfate, zinc carbonate, aluminum silicate, calcium silicate, magnesium silicate, aluminum hydroxide, aluminum sulfate, aluminum phosphate, aluminum lactate, polyaluminum chloride, ferric sulfate, potassium aluminum sulfate, potassium iron alum, and ammonium iron alum. Of these, to prevent deterioration of strength of prior-applied layers due to deliquesce, calcium acetate and aluminum sulfate are preferable.

The liquid composition for surface treatment of the present disclosure is an aqueous medium and articles other than water can be optionally added thereto. Examples are water-soluble organic solvents, surfactants, and other minute amount of additives.

Ink Accommodating Unit

The ink accommodating unit of the present disclosure includes the ink of the present disclosure and an ink container to accommodate the ink and other optional suitably-selected members.

There is no specific limit to the ink container. It is possible to select any form, any structure, any size, and any material to suit to a particular application. For example, an ink container including an ink bag made of aluminum laminate film, plastic film, etc. can be suitably used.

Recording Device and Recording Method

The recording device of the present disclosure includes the ink accommodating unit and a discharging head to discharge (for example, to jet) ink.

The recording method of the present disclosure include discharging (for example, discharging) and attaching a liquid composition for surface treatment and an ink to a recording medium. The liquid composition contains a multivalent metal salt and preferably the ink of the present disclosure.

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing fluids, etc. to a recording medium and a recording method utilizing the device. The recording medium means an article to which ink or various processing fluids can be attached temporarily or permanently.

In addition to the device to attach the liquid composition for surface treatment and the head portion to discharge the ink, the recording device may further optionally include a device relating to feeding, conveying, and ejecting a recording medium and other devices referred to as a pre-processing device, a post-processing device, etc.

The recording device and the recording method may further optionally include a heating device (heater) for use in the heating process and a drying device (drier) for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll-like form as a recording medium.

Figure 2:
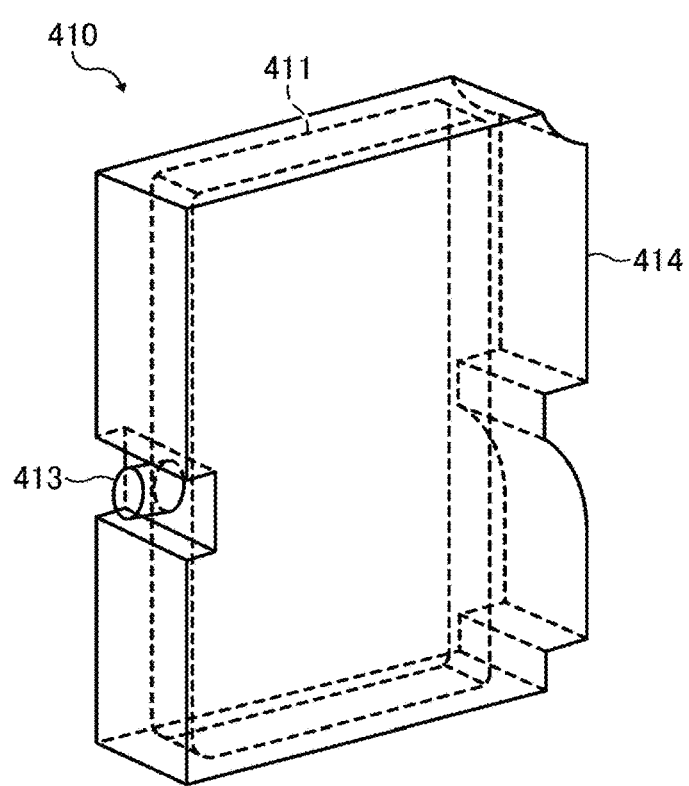
FIG. 2 is a diagram illustrating a perspective view of a main tank to accommodate the ink according to an embodiment of the present disclosure.

The recording device is described using an example with reference to FIG. 1 and FIG. 2. Below is a description about the case using black (K), cyan (C), yellow (Y), and magenta (M). However, the ink of the present disclosure is white ink and images, etc. are printed with the ink of the present disclosure before the color inks of black (K), cyan (C), yellow (Y), and magenta (M). In addition, before printing with the ink of the present disclosure, the liquid composition for surface treatment may be attached to a recording medium.

FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The cartridge holder 404 is detachably attached to the main tank 410. This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

As the pre-processing fluid, the liquid composition for surface treatment can be used.

The recording method of the present disclosure includes forming images on a recording medium with the ink of the present disclosure by an inkjet method and drying the image at a temperature range of from 50 to 200 degrees C. In this temperature range, heat does not affect the recording medium.

The ink of the present disclosure obtains concealing property utilizing scattering of the shell of inorganic hollow particle and hollow portion inside in addition to scattering at the surface of particles as described above. Therefore, after an applied film is dried, if the components of water-soluble organic solvent, etc. remain in the inorganic hollow particle, the concealing property of the applied film deteriorates. Whereas the ink of the present disclosure can be dried quickly at high temperatures since the hollow particle is formed of inorganic materials so that it has better chemical resistance during drying at high temperatures in comparison with the hollow resin particle.

In the ink of the present disclosure, the absolute lightness difference |ΔL*| of a solid image of 50 mm×50 mm formed on a polyethylene terephthalate (PET) film between L*50° C. and L*100° C. satisfies the following relation:

$$|\Delta L^*|=|L^{*}100°\ C.-L^{*}50°\ C.|\leq 10,$$

where L*50° C. and L*100° C. respectively represent a lightness L* after the solid image is dried in a hemathermal tank at 50 degrees C. and 100 degrees C. for one hour.

More preferably, $|\Delta L^*|=|L^{*}100°\ C.-L^{*}50°\ C.|\leq 5$.

When the absolute value of the lightness difference ΔL* is 10 or less, images (for example, degree of whiteness) are particularly stable.

The lightness is the measuring result when the attachment amount of the ink is 20 g/m². For example, it can be measured using a spectrodensitometer (X-Rite 939, manufactured by X-Rite)

How to use the ink is not limited to the inkjet recording method.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

Recorded Matter

The ink recorded matter of the present disclosure includes a recording medium and an image formed on the recording medium with the ink of the present disclosure.

By recording according to an inkjet recording device and an inkjet recording method, the recorded matter is obtained.

The recorded matter of the present disclosure is an article including a recording medium and a print layer thereon. The print layer contains a resin and a spherical inorganic hollow particle.

The ink of the present disclosure is capable of providing an image having particularly good coloring property when applied to a transparent film or a colored recording medium.

Specific examples of the transparent film include, but are not limited to, articles made of plastic such as polvinyl chloride film, polyethylene terephthalate (PET) film, polycarbonate film, acrylic film, polypropylene film, polyimide film, and polystyrene film.

For example, in the case of polyethylene terephthalate (PET) film, an article having a thickness of 100 μm with a total light transmittance of 80 percent or greater is preferable.

Examples of the colored recording medium are colored paper, colored transparent film, fabric, cloth, and ceramics. For color printing, the ink of the present disclosure is used for printing prior to color ink to cover the recording medium with white, thereby enhancing coloring of the color ink.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

An apparatus for manufacturing a solid freeform fabrication to fabricate a three-dimensional solid object can be any known device with no particular limit. For example, the apparatus includes an ink container, a supplying device, and a discharging device, a drier, etc. The three-dimensional solid object includes an object manufactured by repeated ink coating.

In addition, the three-dimensional solid object includes a molded processed product manufactured by processing a structure having a substrate such as a recording medium to which the ink is applied. The molded processed product is fabricated from printed matter or a structure having a sheet-like form, film-like form, etc. by, for example, heating drawing or punching.

The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Average Circularity of Inorganic Hollow Particle

Using a transmission electron microscope (JEM-2100F, manufactured by JEOL Ltd.), images of inorganic hollow particles were taken changing the measuring magnifying power in accordance with the size and the form of the inorganic hollow particle. The thus-obtained TEM image was subject to image analysis utilizing image analysis software to calculate the diameter corresponding to circle and the perimeter of the inorganic hollow particle (outer diameter of particle). Based on the diameter corresponding to circle and the perimeter, circularity of each of 200 inorganic hollow particles was obtained according to the following relation.

Circularity=(Circumferential length obtained from diameter corresponding to circle)/Perimeter (Circumferential length obtained from diameter corresponding to circle)=(diameter corresponding to circle)×π

Of the circularity of the 200 inorganic hollow particles, the top 5 percent and the bottom 5 percent thereof were removed and the average of the rest of the 90 percent was obtained and determined as the average circularity.

Number Average Primary Particle Diameter and Shell Thickness of Inorganic Hollow Particle Using a transmission electron microscope (JEM-2100F, manufactured by JEOL Ltd.), a constant direction diameter between two parallel lines along a certain direction which sandwiched 200 to 500 primary particles of inorganic hollow particles in 30,000 field vision was measured to obtain the number average primary particle diameter and the shell thickness of each of 200 inorganic hollow particles. Of the number average primary particle diameters and the shell thicknesses of the 200 inorganic hollow particles, the top 5 percent and the bottom 5 percent thereof were removed and the average of the rest of the 90 percent was obtained and determined as number average primary particle diameter and the shell thickness.

Manufacturing Example 1 of Inorganic Hollow Particle
Manufacturing of Inorganic Hollow Particle 1
Preparation of Silica Coated Particle 2.0 parts of non-cross-linkable acrylic resin particle (MP1451, manufactured by Soken Chemical & Engineering Co., Ltd.) was sufficiently dispersed in 98.0 parts of water using an ultrasonic homogenizer (US-300T, chip diameter of 7 mm, 100 μAm, 10 minutes, manufactured by NISSEI Corporation). Thereafter, the dispersion was moved to a polyethylene vessel and stirred therein. A few droplets of 1N sodium hydroxide aqueous solution (manufactured by Wako Pure Chemical Industries, Ltd.) were dripped to the dispersion to adjust pH to 10.5. Thereafter, 1.0 part of 3-aminopropyl trimethoxysilane (APTMS, manufactured by Tokyo Chemical Industry Co. Ltd.) and 1.0 part of tetramethoxysilane (TMOS, manufactured by Tokyo Chemical Industry Co. Ltd.) were slowly dripped to the dispersion in this sequence to allow reaction at 25 degrees C. for 10 hours. As a result, silica shells were formed on the surface of the resin particle utilizing sol-gel reaction so that silica-coated particles were obtained.

Preparation of 18 Percent by Mass Aqueous Phase of Inorganic Hollow Particle 1

Next, the thus-obtained silica coated particle was rinsed with water followed by centrifugal to obtain a wet cake of the silica coated particle. Moreover, tetrahydrofuran was added to dissolve the resin particle of the core material. Subsequent to one hour stirring, the resultant was rinsed with water for re-dispersion in water followed by condensation to obtain [18 percent by mass aqueous phase of inorganic hollow particle 1].

In each rinsing process, liquid-liquid replacement was taken to avoid agglomeration that might occur during drying of the silica coated particle or inorganic hollow particle.

Manufacturing Example 3 of Inorganic Hollow Particle
Preparation of Silica Coated Particle 2.0 parts of styrene resin particle (XX-3560Z, manufactured by SEKISUI CHEMICAL CO., LTD.) was sufficiently dispersed in 98.0 parts of water using an ultrasonic homogenizer (US-300T, chip diameter of 7 mm, 100 μA, 10 minutes, manufactured by NISSEI Corporation). Thereafter, the dispersion was moved to a polyethylene vessel and stirred therein. A few droplets of 1N sodium hydroxide aqueous solution (manufactured by Wako Pure Chemical Industries, Ltd.) were dripped to the dispersion to adjust pH to 10.5. Thereafter, 1.0 part of 3-aminopropyl triethoxysilane (APTES, manufactured by Tokyo Chemical Industry Co. Ltd.) and 1.2 part of tetraethoxysilane (TEOS, manufactured by Tokyo Chemical Industry Co. Ltd.) were slowly dripped to the dispersion in this sequence to allow reaction at 25 degrees C. for 10 hours. As a result, silica shells were formed on the surface of the resin particle utilizing sol-gel reaction so that silica-coated particles were obtained. Preparation of 18 Percent by Mass Aqueous Phase of Inorganic Hollow Particle 3

Next, the thus-obtained silica coated particle was rinsed with water followed by centrifugal to obtain a precipitate of the silica coated particle. Thereafter, the resultant was heated to 600 degrees C. at a temperature rising speed of 1 degree C./min and thereafter baked at 600 degrees C. for two hours to remove the styrene resin particle to obtain powder of inorganic hollow particle. The thus-obtained powder was finely loosened with a spatula and water and a dispersant (Disperbyk-190, manufactured by Byc Chemie Japan Co., Ltd.) were added in an amount of 30 percent by mass to the particle and sufficiently stirred. Thereafter, the resultant was sufficiently dispersed using an ultrasonic homogenizer (US-300T, chip diameter of 7 mm, 60 μA, 60 minutes, manufactured by NIS SEI Corporation). Coarse particles were removed utilizing centrifugal (4,000 rpm, one minute) to obtain [18 percent by mass aqueous phase of inorganic hollow particle 3].

Manufacturing Examples 2 and 4 to 10 of Inorganic Hollow Particle

[18 percent by mass aqueous phase of inorganic hollow particle 2] and [18 percent by mass aqueous phase of inorganic hollow particle 5] to [18 percent by mass aqueous phase of inorganic hollow particle 10] were obtained in the same manner as in Manufacturing Example 1 of inorganic hollow particle except that the compositions and the reaction conditions were changed as shown in Table 1.

[18 percent by mass aqueous phase of inorganic hollow particle 4] was obtained in the same manner as in Manufacturing Example 3 of inorganic hollow particle except that the composition and the reaction condition were changed as shown in Table 1.

Manufacturing Example 11 of Inorganic Hollow Particle
Preparation of Silica Coated Particle 12.50 parts of calcium carbonate ("Shiroenka O", particle form: cube, surface treating agent: rosin treatment, primary particle diameter: 30 nm, manufactured by Shiraishi KK) was sufficiently dispersed in 157.65 parts of diglyme (dimethylene glycol dimethylether, manufactured by Kishida Chemical Co., Ltd.) in a beaker using a homogenizer (HG30, C20 cutter, 8,000 rpm, 30 minutes, manufactured by Hitachi Koki Co., Ltd.). Thereafter, while sufficiently stirring and maintaining the dispersion state of calcium carbonate, 7.50 parts of tetraethoxy silane (TEOS, manufactured by Tokyo Chemical Industry Co. Ltd.), 3.52 parts of 28 percent by mass ammonium water (NH4OH, manufactured by Wako Pure Chemical Industries, Ltd.), and 43.03 parts of water were admixed to allow reaction at 25 degrees C. for two hours. As a result, silica shells were formed on the surface of the resin particle utilizing sol-gel reaction so that silica-coated particles were obtained.

Preparation of 18 Percent by Mass Aqueous Phase of Inorganic Hollow Particle 11

Next, the thus-obtained silica-coated particle was rinsed and dispersed in water. Moreover, acetic acid diluted 10 times was added to dissolve calcium carbonate as the core particle. pH was 5.0 after the addition of acetic acid. Thereafter, for desalting, the resultant was rinsed with water and condensed to obtain [18 percent by mass aqueous phase of inorganic hollow particle 11].

In each rinsing process, liquid-liquid replacement was taken to avoid agglomeration that might occur during drying of the silica coated particle or inorganic hollow particle.

Manufacturing Examples 12 and 13 of Inorganic Hollow Particle

[18 percent by mass aqueous phase of inorganic hollow particle 12] and [18 percent by mass aqueous phase of inorganic hollow particle 13] were obtained in the same manner as in Manufacturing Example 11 of inorganic hollow particle except that the compositions and the reaction conditions were changed as shown in Table 2.

Manufacturing Example 14 of Inorganic Hollow Particle

Preparation of Titanium Coated Particle 7.4 parts of non-cross-linkable acrylic resin particle (FS201E, solid portion of 27 percent by mass, manufactured by NIPPONPAINT Co., Ltd.) was sufficiently dispersed in 92.6 parts of water using an ultrasonic homogenizer (US-300T, chip diameter of 7 mm, 100 µA, 10 minutes, manufactured by NISSEI Corporation). Thereafter, the dispersion was moved to a polyethylene vessel and stirred therein. A few droplets of 1N sodium hydroxide aqueous solution (manufactured by Wako Pure Chemical Industries, Ltd.) were dripped to the dispersion to adjust pH to 10.5. Thereafter, 1.0 part of titanium amino ethyl aminoethanolate (Orgatix TC-510, manufactured by Matsumoto Fine Chemical Co. Ltd.) and 1.2 parts of tetraisopropoxytitanium (TPT, manufactured by NIPPON SODA CO., LTD.) were slowly added to the liquid dispersion in this order to allow reaction at 25 degrees C. for 20 hours to form titanium shell on the surface of the resin particle utilizing sol-gel reaction. Thus, titanium coated particle was obtained.

Preparation of 18 Percent by Mass Aqueous Phase of Titanium Hollow Particle 1

Next, the thus-obtained titanium coated particle was rinsed with water followed by centrifugal to obtain a wet cake of the titanium coated particle. Moreover, tetrahydrofuran was added to dissolve the resin particle of the core material. Subsequent to one hour stirring, the resultant was rinsed with water to be re-dispersed in water followed by condensation to obtain [18 percent by mass aqueous phase of titanium hollow particle].

In each rinsing process, liquid-liquid replacement was conducted to avoid agglomeration that may occur during drying of the titanium coated particle or titanium hollow particle.

Figure 3:
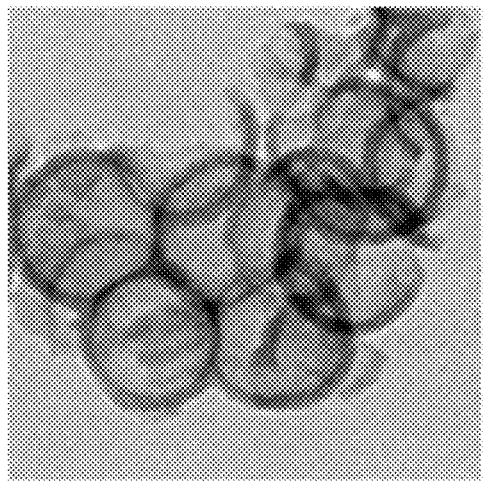
FIG. 3 is a transmission electron microscope (TEM) image of an inorganic hollow particle 3 obtained in Manufacturing Example 3 described later.
Figure 4:
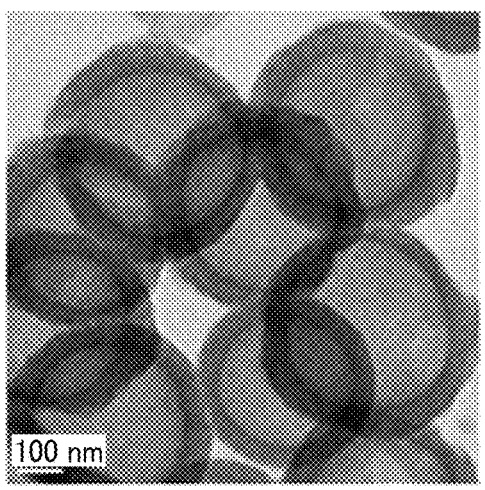
FIG. 4 is a transmission electron microscope (TEM) image of an inorganic hollow particle 7 obtained in Manufacturing Example 7 described later.
Figure 5:
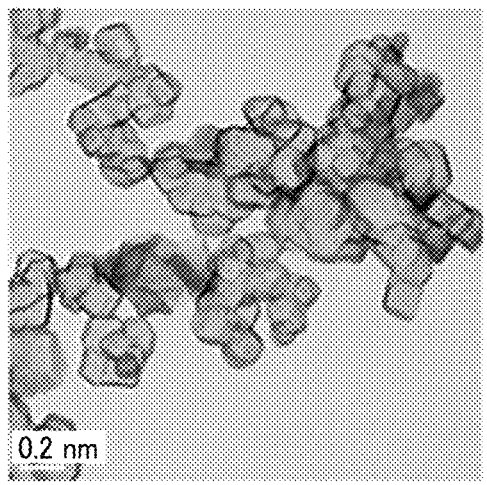
FIG. 5 is a transmission electron microscope (TEM) image of an inorganic hollow particle 13 obtained in Manufacturing Example 13 described later.

The TEM images of inorganic hollow particle 3, the inorganic hollow particle 7, and the inorganic hollow particle 13 obtained in Manufacturing Examples 3, 7, and 13 respectively are illustrated in FIGS. 3, 4, and 5.

TABLE 1

| | Core material (resin particle) | | | Water | Silicon alkoxide 1 | |
| --- | --- | --- | --- | --- | --- | --- |
| | Kind | Surface charge | Addition amount (in solid portion) (parts) | Addition amount (parts) | Kind | Addition amount (parts) |
| Inorganic hollow particle 1 | MP1451 | Negatively charged | 2.0 | 98.0 | APTMS | 1.0 |
| Inorganic hollow particle 2 | MP2800 | Positively charged | 2.0 | 98.0 | APTMS | 1.0 |
| Inorganic hollow particle 3 | XX-3560Z | — | 2.0 | 98.0 | APTES | 1.0 |
| Inorganic hollow particle 4 | XX-3560Z | — | 1.5 | 98.5 | APTES | 1.0 |
| Inorganic hollow particle 5 | FS201E | Negatively charged | 4.0 | 96.0 | APTES | 1.0 |
| Inorganic hollow particle 6 | FS201E | Negatively charged | 3.2 | 96.8 | APTES | 1.0 |
| Inorganic hollow particle 7 | FS201E | Negatively charged | 2.0 | 98.0 | APTES | 1.0 |
| Inorganic hollow particle 8 | FS201E | Negatively charged | 1.3 | 98.7 | APTES | 1.0 |
| Inorganic hollow particle 9 | FS201E | Negatively charged | 1.2 | 98.8 | APTES | 1.0 |
| Inorganic hollow particle 10 | FS301E | Negatively charged | 2.4 | 97.6 | APTMS | 1.0 |

TABLE 1-continued

|  | Silicon alkoxide 2 | | Reaction | | Removal of core material |
|---|---|---|---|---|---|
|  | Kind | Addition amount (parts) | Temperature | Time | Condition |
| Inorganic hollow particle 1 | TMOS | 1.0 | 25 degrees C. | 10 h | THF dissolution |
| Inorganic hollow particle 2 | TMOS | 1.0 | 25 degrees C. | 20 h | THF dissolution |
| Inorganic hollow particle 3 | TEOS | 1.2 | 25 degrees C. | 10 h | Heat treatment |
| Inorganic hollow particle 4 | TEOS | 1.2 | 25 degrees C. | 20 h | Heat treatment |
| Inorganic hollow particle 5 | TEOS | 1.2 | 25 degrees C. | 10 h | THF dissolution |
| Inorganic hollow particle 6 | TEOS | 1.2 | 25 degrees C. | 10 h | THF dissolution |
| Inorganic hollow particle 7 | TEOS | 1.2 | 25 degrees C. | 20 h | THF dissolution |
| Inorganic hollow particle 8 | TEOS | 1.2 | 25 degrees C. | 20 h | THF dissolution |
| Inorganic hollow particle 9 | TEOS | 1.2 | 25 degrees C. | 20 h | THF dissolution |
| Inorganic hollow particle 10 | TMOS | 1.0 | 25 degrees C. | 10 h | THF dissolution |

TABLE 2

| | Core material (calcium carbonate) | | | | Solvent | | Water |
|---|---|---|---|---|---|---|---|
| | Kind | Surface treatment | Primary particle diameter | Addition amount (parts) | Kind | Addition amount (parts) | Addition amount (parts) |
| Inorganic hollow particle 11 | "Shiroenka O" | Rosin acid | 30 nm | 12.50 | Diglyme | 157.65 | 43.03 |
| Inorganic hollow particle 12 | Homocal-DM | Rosin acid | 80 nm | 12.50 | Methanol | 157.65 | 42.15 |
| Inorganic hollow particle 13 | Brilliant 1500 | — | 150 nm | 12.50 | Diglyme | 157.65 | 43.03 |

| | Silicon alkoxide | | Catalyst | | Reaction | | pH after addition of acid |
|---|---|---|---|---|---|---|---|
| | Kind | Addition amount (parts) | Kind | Addition amount of $NH_3$ (parts) | Temperature | Time | |
| Inorganic hollow particle 11 | TEOS | 7.50 | $NH_4OH$ | 3.52 | 25 degrees C. | 2 h | 5.0 |
| Inorganic hollow particle 12 | TEOS | 9.00 | $NH_4OH$ | 4.40 | 25 degrees C. | 3 h | 5.0 |
| Inorganic hollow particle 13 | TEOS | 7.50 | $NH_4OH$ | 3.52 | 25 degrees C. | 1 h | 4.5 |

TABLE 3

| | Core material (resin particle) | | | Water | Titanium alkoxide 1 | |
|---|---|---|---|---|---|---|
| | Kind | Surface charge | Addition amount (in solid portion) (parts) | Addition amount (parts) | Kind | Addition amount (parts) |
| Inorganic hollow particle 14 | FS201E | Negatively charged | 2.0 | 98.0 | TC-510 | 1.0 |

| | Titanium alkoxide 2 | | Reaction | | Removal of core material |
|---|---|---|---|---|---|
| | Kind | Addition amount (parts) | Temperature | Time | Condition |
| Inorganic hollow particle 14 | TPT | 1.2 | 25 degrees C. | 20 h | THF dissolution |

The detail of the material in Tables 1, 2, and 3 is as follows: Core material (resin particle)
 MP1451 (non-cross-linkable acrylic resin particle, negatively-charged, manufactured by Soken Chemical & Engineering Co., Ltd.)
 MP2800 (non-cross-linkable acrylic resin particle, negatively-charged, manufactured by Soken Chemical & Engineering Co., Ltd.)
 XX-3560Z (styrene resin particle, manufactured by SEKISUI CHEMICAL CO., LTD.)
 FS201E (non-cross-linkable styrene acrylic resin particle water dispersion, solid portion of 27 percent by mass, negatively-charged, manufactured by NIPPONPAINT Co., Ltd.)
 FS301E (non-cross-linkable styrene acrylic resin particle water dispersion, solid portion of 27 percent by mass, negatively-charged, manufactured by NIPPONPAINT Co., Ltd.)
Core Material (Calcium Carbonate)
 "Shiroenka O: (particle form: cube, surface treating agent: rosin acid, number average primary particle diameter of 30 nm, manufactured by Shiraishi KK)
 Homocal-D (particle form: cube, surface treating agent: rosin acid, number average primary particle diameter of 80 nm, manufactured by Shiraishi KK)
 Brilliant1500 (particle form: cube, surface treating agent: none, number average primary particle diameter of 150 nm, manufactured by Shiraishi KK)
Solvent
 Methanol (manufactured by Tokyo Chemical Industry Co. Ltd.)
 Diglyme: (dimethylene glycol dimethylether, manufactured by Kishida Chemical Co., Ltd.)
Silicon Alkoxide
 3-aminopropyl methoxysilane: (APTMS, manufactured by Tokyo Chemical Industry Co. Ltd.)
 3-aminopropyl ethoxysilane: (APTES, manufactured by Tokyo Chemical Industry Co. Ltd.)
 Tetramethoxysilane: (TMOS, manufactured by Tokyo Chemical Industry Co. Ltd.)
 Tetraethoxysilane: (TEOS, manufactured by Tokyo Chemical Industry Co. Ltd.)
Titanium Alkoxide
 Tetraisopropoxy titanium: (TPT, manufactured by NIPPON SODA CO., LTD.)
 Titanium aminoethyl amionoethanolate (TC-510, manufactured by Matsumoto Fine Chemical Co. Ltd.)

Preparation Example 1

Preparation of Liquid Dispersion 1 of Inorganic Hollow Particle
 6 parts of a copolymer (dispersant, Disperbyk-190, effective component of 100 percent by mass, manufactured by Byc Chemie Japan Co., Ltd.) including an amino group and 12 parts of water were added to 100 parts of [18 percent by mass of inorganic hollow particle 1] and sufficiently stirred. Thereafter, the mixture was dispersed by an ultrasonic wave homogenizer (US-300T, chip diameter of 7 mm, 100 µA, 30 minutes, manufactured by NISSEI Corporation). Coarse particles of the thus-obtained liquid dispersion were removed by centrifugal (4,000 rpm. one minute) and filtrated by a membrane filter (cellulose acetate film) having an average opening diameter of 5 µm to prepare [Liquid dispersion 1 of inorganic hollow particle] (concentration of inorganic hollow particle of 15 percent by mass).

Preparation Examples 2 to 13

Preparation of Liquid Dispersions 2 to 13 of Inorganic Hollow Particle
 [Liquid dispersion 2 of inorganic hollow particle] to [Liquid dispersion 13 of inorganic hollow particle] were prepared in the same manner as in Preparation Example 1 except that [18 percent by mass aqueous phase of inorganic hollow particle 1] was changed to [18 percent by mass aqueous phase of inorganic hollow particle 2] to [18 percent by mass aqueous phase of inorganic hollow particle 13], respectively.

Preparation Example 14

Preparation of Liquid Dispersion 14 of Inorganic Hollow Particle
 [18 percent by mass organic solvent phase of inorganic hollow particle 7] was obtained in the same manner as in Manufacturing Example 7 of inorganic hollow particle except that the solvent was changed from water to y-butylolactone.

Thereafter, 7.2 parts of a copolymer (dispersant, Disperbyk-190, effective component of 100 percent by mass, manufactured by Byc Chemie Japan Co., Ltd.) including an amino group and 12.8 parts of y-butylolactone were added to 100 parts of [18 percent organic solvent phase of inorganic hollow particle 7].

Subsequent to sufficient stirring, the mixture was dispersed by an ultrasonic wave homogenizer (US-300T, chip diameter of 7 mm, 100 µA, 30 minutes, manufactured by NISSEI Corporation) while being water-cooled.

The thus-obtained solvent liquid dispersion of the obtained inorganic hollow particle 7 was removed by centrifugal (4,000 rpm. one minute) and filtrated by a membrane filter (PTFE film) having an average opening diameter of 5 µm to obtain [Liquid dispersion 14 of inorganic hollow particle] (concentration of particle of 15 percent by mass).

Preparation Example 15

Preparation of Liquid Dispersion 15 of Inorganic Hollow Liquid Dispersion

Inorganic hollow particles (SiliNax, outer diameter of 90 nm, inner diameter of 80 nm, water dispersion type, manufactured by Nittetsu Mining Co., Ltd.) available on the market were subject to treatment to have a concentration of solid portion of 15 percent by mass to obtain [Liquid dispersion 15 of inorganic hollow particle].

Preparation Example 16

Preparation of Liquid Dispersion of Hollow Resin Particle
The following recipe was mixed and stirred.
ethylene glycol dimethacrylate (BLEMMER® PDE-50R, number of polyoxyethylene units: 1, manufactured by NOF CORPORATION) as polymerizable monomer: 25 parts
trimethylol propane trimethacrylate (SR351S, manufactured by Sartomer Company): 50 parts
acrylonitrile: 25 parts
toluene as non-polymerizable compound: 95 parts
hexadecane: 5 parts
azobisisobutylonitrile: 1 part The thus-obtained liquid mixture was all added to 2 percent by mass sodium dodecylbenzenesulfonate as water-soluble emulsifier and 1,600 parts of deionized water including 1 percent by mass cetyl alcohol as dispersion helping agent followed by forcible emulsification by an ultrasonic homogenizer for 60 minutes to prepare a liquid dispersion in which polymerizable liquid droplets were dispersed.

Thereafter, a polymerization vessel of 20 L equipped with a stirrer, a jacket, a reflux condenser, and a thermometer was decompressed followed by deoxidization in the vessel.

The pressure was returned to atmosphere pressure by nitrogen gas so that the inside of the polymerization vessel was in nitrogen atmosphere. Into this polymerization vessel, all of the thus-obtained liquid dispersion was charged at once and thereafter the vessel was heated to 60 degrees C. to initiate polymerization. After polymerization for four hours, the polymerizable vessel was cooled down to room temperature (25 degrees C.) to obtain microcapsule slurry including non-polymerizable compound. The thus-obtained slurry was dried using a spray drier to prepare hollow particles.

The thus-obtained hollow particle was observed with a transmission electron microscope (JEM-1200 EXII, manufactured by JEOL Ltd.). The form was almost spherical and the average particle diameter was 0.35 µm. In addition, the thus-obtained hollow particle had a structure having a single hole inside.

5 parts of acrylic block copolymer including an amino group (dispersant, BYKJET-9151, amine value of 18 mgKOH/g, effective component of 100 percent by mass, manufactured by Byc Chemie Japan Co., Ltd.) was caused to be dissolved in 80 parts of water using a mayonnaise bottle (70 mL, UM sample bottle, manufactured by AS ONE Corporation.). Thereafter, 15 parts of the thus-obtained hollow particle was added and the mixture was sufficiently stirred. Thereafter, 80 parts of zirconia ball having a diameter of 2 mm was added thereto followed by dispersion for two days by a ball mill under the following condition.

The thus-obtained liquid dispersion was filtrated by a membrane filter (PTFE membrane) having an average opening diameter of 5 µm to prepare [Liquid dispersion of hollow resin particle] (particle concentration of 15 percent by mass).

Condition of Ball Mill

Media: YTZ ball diameter of 5 mm (zirconia ball, manufactured by NIKKATO CORPORATION), YTZ ball diameter of 1 mm (zirconia ball, manufactured by NIKKATO CORPORATION)

Mill: MIX-ROTAR VMR-5 (manufactured by AS ONE Corporation)

Number of rotation: 75 rpm (number of rotation of mayonnaise bottle)

Preparation Example 17

Preparation of Liquid Dispersion of Titanium Oxide 18.0 parts of acrylic copolymer (dispersant, DISPER-BYK-2008, amine value of 66 mgKOH/g, effective component of 100 percent by mass, manufactured by Byc Chemie Japan Co., Ltd.) was dissolved in 67.0 parts of pure water in a beaker. 15.0 parts of titanium dioxide (JR-600A, number average primary particle diameter of 250 nm, surface treatment: A1, manufactured by TAYCA CORPORATION) was added thereto. While being water-cooled down, the mixture was dispersed by a homogenizer (HG30, C20 cutter, 8,000 rpm, 60 minutes, manufactured by Hitachi Koki Co., Ltd.).

The thus-obtained pigment liquid dispersion of titanium dioxide was filtrated by a membrane filter having an average opening diameter of 5 µin (cellulose acetate membrane) to prepare [Liquid dispersion of titanium oxide] (particle concentration of titanium oxide of 15 percent by mass).

Examples 1 to 14 and Comparative Examples 1 to 9

Ink 1 to 13, 15 to 21, and 23

Preparation of Aqueous Ink

Inks of the compositions shown in Tables 4 and 5 were prepared by a typical method and filtrated by a membrane filter having an average opening diameter of 5µm (cellulose acetate membrane) to prepare aqueous inks of inks 1 to 13, 15 to 21, and 23.

Ink 14 and 22

Preparation of Solvent Ink

Inks of the compositions shown in Tables 4 and 5 were prepared by a typical method and filtrated by a membrane filter having an average opening diameter of 5 µm (cellulose acetate membrane) to prepare solvent inks of inks 14 and 22.

TABLE 4

| | | Ink 1 | Ink 2 | Ink 3 | Ink 4 | Ink 5 |
|---|---|---|---|---|---|---|
| Liquid dispersion or coloring material | | Liquid dispersion 1 of inorganic hollow particle | Liquid dispersion 2 of inorganic hollow particle | Liquid dispersion 3 of inorganic hollow particle | Liquid dispersion 4 of inorganic hollow particle | Liquid dispersion 5 of inorganic hollow particle |
| Inorganic Hollow Particle | | Inorganic hollow particle 1 | Inorganic hollow particle 2 | Inorganic hollow particle 3 | Inorganic hollow particle 4 | Inorganic hollow particle 5 |
| Liquid dispersion or coloring material | | 66.7 | 53.3 | 53.3 | 53.3 | 53.3 |
| | | | Aqueous ink | | | |
| 1,2-Propane diol: | | 14 | 14 | 18 | 16 | 14 |
| 1,2-Butane diol | | | 8 | 8 | 10 | 7 |
| 1,5-Pentane diol | | 6 | | | | |
| 1,6-Hexane diol | | | 4 | 4 | 4 | 5 |
| 3-Methoxy-3-methyl-1-butanol | | 3 | | | | |
| 3-Methyl-1,3-butane diol | | | | | | |
| Diethylene glycol monoethyl ether | | 3 | | | | |
| Diethylene glycol monobutyl ether | | | 4 | 4 | 4 | 4 |
| Amide compound | | | | | | |
| Glycerin | | | | | | |
| Resin particle (amount of solid portion) | A | 5 | | | | |
| | B | | 6 | | | 7 |
| | C | | | 5 | | |
| | D | | | | 6 | |
| | E | | | | | |
| Surfactant | A | 0.1 | | | | |
| | B | | 0.1 | 0.1 | 0.1 | 0.1 |
| | C | | | | | |
| Defoaming agent | ADO1 | 0.5 | 0.5 | 0.5 | 0.5 | 0.5 |
| Preservatives and fungicides | PROXEL LV | 0.05 | 0.05 | 0.05 | 0.05 | 0.05 |
| pH Regulator | 1N—NaOH | 0.5 | 0.5 | 0.5 | 0.5 | 0.5 |
| Water | | 1.15 | 9.55 | 6.55 | 5.55 | 8.55 |
| | | | Solvent Ink | | | |
| Triethylene glycol diethylether | | | | | | |
| Diethylene glycol diethylether | | | | | | |
| γ-butylolactone | | | | | | |
| Resin particle (amount of solid portion) | | | | | | |
| Epoxidized soybean oil | | | | | | |
| Dispersant | | | | | | |
| Total | | 100 | 100 | 100 | 100 | 100 |

| | | Ink 6 | Ink 7 | Ink 8 | Ink 9 | Ink 10 |
|---|---|---|---|---|---|---|
| Liquid dispersion or coloring material | | Liquid dispersion 6 of inorganic hollow particle | Liquid dispersion 7 of inorganic hollow particle | Liquid dispersion 8 of inorganic hollow particle | Liquid dispersion 9 of inorganic hollow particle | Liquid dispersion 10 of inorganic hollow particle |
| Inorganic Hollow Particle | | Inorganic hollow particle 6 | Inorganic hollow particle 7 | Inorganic hollow particle 8 | Inorganic hollow particle 9 | Inorganic hollow particle 10 |
| Liquid dispersion or coloring material | | 53.3 | 53.3 | 53.3 | 53.3 | 53.3 |
| | | | Aqueous ink | | | |
| 1,2-Propane diol: | | 12 | 18 | 16 | 14 | 12 |
| 1,2-Butane diol | | 5 | 6 | | 4 | |
| 1,5-Pentane diol | | | | 6 | | |
| 1,6-Hexane diol | | 3 | | | 4 | |
| 3-Methoxy-3-methyl-1-butanol | | | 3 | 4 | | 5 |
| 3-Methyl-1,3-butane diol | | | 3 | | | 8 |
| Diethylene glycol monoethyl ether | | | | 4 | | 5 |
| Diethylene glycol monobutyl ether | | 3 | | | 4 | |
| Amide compound | | | | | | |
| Glycerin | | | | | | |
| Resin particle (amount of solid portion) | A | | | | | |
| | B | | | 6 | | 6 |
| | C | | | | | |
| | D | 5.5 | 5 | | | |
| | E | | | | 4.5 | |

TABLE 4-continued

| Surfactant | A | | 0.1 | | | 0.1 |
|---|---|---|---|---|---|---|
| | B | 0.1 | | 0.1 | 0.1 | |
| | C | | | | | |
| Defoaming agent | ADO1 | 0.5 | 0.5 | 0.5 | 0.5 | 0.5 |
| Preservatives and fungicides | PROXEL LV | 0.05 | 0.05 | 0.05 | 0.05 | 0.05 |
| pH Regulator | 1N—NaOH | 0.5 | 0.5 | 0.5 | 0.5 | 0.5 |
| Water | | 17.05 | 10.55 | 9.55 | 15.05 | 9.55 |

Solvent Ink

Triethylene glycol diethylether
Diethylene glycol diethylether
γ-butylolactone
Resin particle (amount of solid portion)
Epoxidized soybean oil
Dispersant

| Total | 100 | 100 | 100 | 100 | 100 |
|---|---|---|---|---|---|

| | | Ink 11 | Ink 12 | Ink 13 | Ink 14 |
|---|---|---|---|---|---|
| Liquid dispersion or coloring material | | Liquid dispersion 9 of inorganic hollow particle | Liquid dispersion 7 of inorganic hollow particle | 18 percent aqueous phase of titanium hollow particle | Liquid dispersion 14 of inorganic hollow particle |
| Inorganic Hollow Particle | | Inorganic hollow particle 9 | Inorganic hollow particle 7 | Inorganic hollow particle 14 | Inorganic hollow particle 7 |
| Liquid dispersion or coloring material | | 40 | 53.3 | 53.3 | 53.3 |

Aqueous ink

| 1,2-Propane diol: | | 13.55 | 12 | 14 | |
|---|---|---|---|---|---|
| 1,2-Butane diol | | 6 | | 7 | |
| 1,5-Pentane diol | | | | | |
| 1,6-Hexane diol | | | | 5 | |
| 3-Methoxy-3-methyl-1-butanol | | 2 | | | |
| 3-Methyl-1,3-butane diol | | 2 | 10.5 | | |
| Diethylene glycol monoethyl ether | | | | | |
| Diethylene glycol monobutyl ether | | | | 4 | |
| Amide compound | | | 10 | | |
| Glycerin | | | 0.5 | | |
| Resin particle (amount of solid portion) | A | | | | |
| | B | | | 7 | |
| | C | | | | |
| | D | 5 | 5 | | |
| | E | | | | |
| Surfactant | A | 0.1 | | | |
| | B | | | 0.1 | |
| | C | | 0.1 | | |
| Defoaming agent | ADO1 | 0.5 | 0.5 | 0.5 | |
| Preservatives and fungicides | PROXEL LV | 0.05 | 0.05 | 0.05 | |
| pH Regulator | 1N—NaOH | 0.5 | 0.5 | 0.5 | |
| Water | | 30.3 | 7.55 | 8.55 | |

Solvent Ink

| Triethylene glycol diethylether | | | | | 17.2 |
|---|---|---|---|---|---|
| Diethylene glycol diethylether | | | | | 20 |
| γ-butylolactone | | | | | 2 |
| Resin particle (amount of solid portion) | | | | | 5.5 |
| Epoxidized soybean oil | | | | | 2 |
| Dispersant | | | | | |

| Total | 100 | 100 | 100 | 100 |
|---|---|---|---|---|

TABLE 5

|  |  | Ink 15 | Ink 16 | Ink 17 | Ink 18 | Ink 19 |
|---|---|---|---|---|---|---|
| Liquid dispersion or coloring material | | Liquid dispersion 15 of inorganic hollow particle | Liquid dispersion 11 of inorganic hollow particle | Liquid dispersion 12 of inorganic hollow particle | Liquid dispersion 13 of inorganic hollow particle | Liquid dispersion of hollow resin particle |
| Inorganic hollow particle | | SiliNax | Inorganic hollow particle 11 | Inorganic hollow particle 12 | Inorganic hollow particle 13 | — |
| Liquid dispersion or coloring material | | 53.3 | 53.3 | 53.3 | 53.3 | 53.3 |
| | | | Aqueous ink | | | |
| 1,2-Propane diol: | | 16 | 14 | 18 | 16 | 14 |
| 1,2-Butane diol | | | 8 | 6 | 8 | |
| 1,5-pentane diol | | 6 | | | | 6 |
| 1,6-Hexane diol | | | 4 | | 4 | |
| 3-Methoxy-3-methyl-1-butanol | | 4 | | 3 | | 6 |
| 3-methyl-1,3-butane diol | | | | 3 | | |
| Diethylene glycol monoethyl ether | | 4 | | | | 4 |
| Diethylene glycol monobutyl ether | | | 4 | | 4 | |
| Amide compound | | | | | | |
| Glycerin | | | | | | |
| Resin particle (amount of solid portion) | A | | | | | |
| | B | | | 4.5 | | |
| | C | | | | | |
| | D | 5 | 6 | | | 4.5 |
| | E | | | | 5 | |
| Surfactant | A | 0.1 | | 0.1 | | 0.1 |
| | B | | 0.1 | | 0.1 | |
| | C | | | | | |
| Defoaming agent | ADO1 | 0.5 | 0.5 | 0.5 | 0.5 | 0.5 |
| Preservatives and fungicides | PROXEL LV | 0.05 | 0.05 | 0.05 | 0.05 | 0.05 |
| pH regulator | 1N—NaOH | 0.5 | 0.5 | 0.5 | 0.5 | 0.5 |
| Water | | 10.55 | 9.55 | 11.05 | 8.55 | 11.05 |
| | | | Solvent ink | | | |
| Triethylene glycol diethylether | | | | | | |
| Diethylene glycol diethylether | | | | | | |
| γ-butylolactone | | | | | | |
| Resin particle (amount of solid portion) | | | | | | |
| Epoxidized soybean oil | | | | | | |
| Dispersant | | | | | | |
| Total | | 100 | 100 | 100 | 100 | 100 |

|  |  | Ink 20 | Ink 21 | Ink 22 | Ink 23 |
|---|---|---|---|---|---|
| Liquid dispersion or coloring material | | Liquid dispersion of hollow resin particle | Liquid dispersion of titanium oxide | Hollow resin particle | Liquid dispersion 1 of inorganic hollow particle |
| Inorganic hollow particle | | — | — | — | Inorganic hollow particle 1 |
| Liquid dispersion or coloring material | | 53.3 | 53.3 | 8 | 66.7 |
| | | | Aqueous ink | | |
| 1,2-Propane diol: | | 12.5 | 14 | | 17 |
| 1,2-Butane diol | | | | | |
| 1,5-pentane diol | | | 6 | | 6 |
| 1,6-Hexane diol | | | | | |
| 3-Methoxy-3-methyl-1-butanol | | | 5 | | 3 |
| 3-methyl-1,3-butane diol | | 10 | | | |
| Diethylene glycol monoethyl ether | | | 5 | | 3 |
| Diethylene glycol monobutyl ether | | | | | |
| Amide compound | | 10 | | | |
| Glycerin | | 0.5 | | | |
| Resin particle (amount of solid portion) | A | | | | |
| | B | | 5 | | |
| | C | | | | |
| | D | 5 | | | |
| | E | | | | |

TABLE 5-continued

| Surfactant | A | | 0.1 | 0.1 |
|---|---|---|---|---|
| | B | | | |
| | C | 0.1 | | |
| Defoaming agent | ADO1 | 0.5 | 0.5 | 0.5 |
| Preservatives and fungicides | PROXEL LV | 0.05 | 0.05 | 0.05 |
| pH regulator | 1N—NaOH | 0.5 | 0.5 | 0.5 |
| Water | | 7.55 | 10.55 | 3.15 |
| Solvent ink | | | | |
| Triethylene glycol diethylether | | | 15.7 | |
| Diethylene glycol diethylether | | | 31 | |
| γ-butylolactone | | | 34.3 | |
| Resin particle (amount of solid portion) | | | 5 | |
| Epoxidized soybean oil | | | 2 | |
| Dispersant | | | 4 | |
| Total | | 100 | 100 | 100 | 100 |

In aqueous ink shown in Tables 4 and 5, the details of the material used are as follows:
- 1,2-Propane diol (boiling point: 188 degrees C.)
- 1,2-Butane diol (boiling point: 195 degrees C.)
- 1,5-Pentanediolentane diol (boiling point: 242 degrees C.)
- 1,6-Hexane diol (boiling point: 223 degrees C.)
- 3-Methoxy-3-methyl-1-butanol (boiling point: 174 degrees C.)
- 3-Methyl-1,3-butane diol (boiling point: 204 degrees C.)
- Diethylene glycol monoethyl ether (boiling point: 194 degrees C.)
- Diethylene glycol monobutyl ether (boiling point: 230 degrees C.)
- Amide compound: amide compound represented by the following chemical structure (equamide™ M100, boiling point of 216 degrees C., manufactured by Idemitsu Kosan Co., Ltd.)

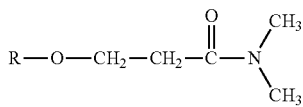

In the chemical structure, R=CH$_3$.
- Glycerin (boiling point: 290 degrees C.)
- Resin particle A: acrylic resin (VONCOAT CF-6140, manufactured by DIC)
- Resin particle B: styrene acrylic resin (Vinyblan 2685, manufactured by Nissin Chemical Industry Co., Ltd.)
- Resin particle C: polyester resin (ELITEL® KA-5034, manufactured by UNITIKA LTD.)
- Resin particle D: polyurethane resin (W-5661, manufactured by Mitsui Chemicals, Inc.)
- Resin particle E: vinyl chloride resin (Vinyblan 735, manufactured by Nissin Chemical Industry Co., Ltd.)
- Surfactant A: fluorochemical surfactant (Capstone FS-34, manufactured by Chemours)
- Surfactant B: fluorochemical surfactant (Capstone FS-3100, manufactured by Chemours)
- Surfactant C: fluorochemical surfactant (Capstone FS-30, manufactured by Chemours)
- Defoaming agent (EMBIROGEM® AD-01, manufactured by Air Products Limited)
- Preservatives and fungicides (PROXEL LV, available from Lonza Japan Ltd.)
- pH Regulator: 1N—NaOH In solvent ink shown in Tables 4 and 5, the details of the material used are as follows:
- The hollow resin particle of the ink 22 is a hollow resin particle which is not dispersed in water in Preparation Example 16.
- Triethylene glycol diethylether (boiling point of 216 degrees C.)
- Diethylene glycol diethylether (boiling point of 188 degrees C.)
- γ-butylolactone (boiling point of 204 degrees C.)
- Resin particle: polyester resin (PESRESIN S-110EA, manufactured by TAKAMATSU OIL & FAT CO., LTD.)
- Epoxidized soybean oil (KAPDX S-6, manufactured by Kao Corporation)
- Dispersant: Solsperse 5000 (manufactured by The Lubrizol Corporation)

Properties of the obtained inks are shown in Table 6

TABLE 6

| | Ink | Particle | Pigment particle form | Average circularity | Number-average primary particle diameter (nm) | Shell thickness (nm) |
|---|---|---|---|---|---|---|
| Example 1 | Ink 1 | Inorganic hollow particle 1 | Spherical | 0.96 | 180 | 20 |
| Example 2 | Ink 2 | Inorganic hollow particle 2 | Spherical | 0.98 | 200 | 15 |

TABLE 6-continued

| | Ink | Particle | Pigment particle form | Average circularity | Number-average primary particle diameter (nm) | Shell thickness (nm) |
|---|---|---|---|---|---|---|
| Example 3 | Ink 3 | Inorganic hollow particle 3 | Spherical | 0.97 | 300 | 10 |
| Example 4 | Ink 4 | Inorganic hollow particle 4 | Spherical | 0.96 | 310 | 20 |
| Example 5 | Ink 5 | Inorganic hollow particle 5 | Spherical | 0.99 | 490 | 15 |
| Example 6 | Ink 6 | Inorganic hollow particle 6 | Spherical | 0.99 | 500 | 15 |
| Example 7 | Ink 7 | Inorganic hollow particle 7 | Spherical | 0.99 | 510 | 30 |
| Example 8 | Ink 8 | Inorganic hollow particle 8 | Spherical | 0.99 | 530 | 50 |
| Example 9 | Ink 9 | Inorganic hollow particle 9 | Spherical | 1.00 | 540 | 55 |
| Example 10 | Ink 10 | Inorganic hollow particle 10 | Spherical | 1.00 | 700 | 20 |
| Example 11 | Ink 11 | Inorganic hollow particle 9 | Spherical | 1.00 | 540 | 55 |
| Example 12 | Ink 12 | Inorganic hollow particle 7 | Spherical | 0.99 | 510 | 30 |
| Example 13 | Ink 13 | Inorganic hollow particle 14 | Spherical | 0.98 | 500 | 15 |
| Comparative Example 1 | Ink 15 | SiliNax | Non-spherical | 0.88 | 90 | 10 |
| Comparative Example 2 | Ink 16 | Inorganic hollow particle 11 | Non-spherical | 0.92 | 30 | 10 |
| Comparative Example 3 | Ink 17 | Inorganic hollow particle 12 | Non-spherical | 0.89 | 100 | 10 |
| Comparative Example 4 | Ink 18 | Inorganic hollow particle 13 | Non-spherical | 0.88 | 160 | 10 |
| Comparative Example 5 | Ink 19 | Hollow resin particle | Spherical | — | 350 | 40 |
| Comparative Example 6 | Ink 20 | Hollow resin particle | Spherical | — | 350 | 40 |
| Comparative Example 7 | Ink 21 | Titanium Oxide | Non-spherical | — | 330 | — |
| Comparative Example 8 | Ink 23 | Inorganic hollow particle 1 | Spherical | 0.96 | 180 | 20 |
| Example 14 | Ink 14 | Inorganic hollow particle 7 | Spherical | 0.99 | 510 | 30 |
| Comparative Example 9 | Ink 22 | Hollow resin particle | Spherical | — | 350 | 40 |

Liquid Compositions 1 to 9 for Surface Treatment

Preparation of Liquid Composition 1 for Surface Treatment

The following recipe was prescribed and thereafter mixed and stirred followed by filtration using a filter having an opening of 5μm to obtain liquid composition 1 for surface treatment.

1,2-Propane diol: 10.00 parts
EMULGEN LS-106 (nonionic surfactant, manufactured by Kao Corporation): 1.00 part
Calcium acetate monohydrate: 1.76 parts
Ethylene vinyl acetate resin emulsion A (solid portion): 10.00 parts PROXEL LV (asepticus, manufactured by Lonza Japan Ltd.): 0.10 parts Deionized water: 77.14 parts Preparation of Liquid Compositions 2 to 9 for Surface Treatment Liquid compositions 2 to 9 for surface treatment were prepared in the same manner as for liquid composition 1 for surface treatment using the prescriptions shown in Table 7.

TABLE 7

| Component | Liquid composition for surface treatment | | | | |
|---|---|---|---|---|---|
| | 1 | 2 | 3 | 4 | 5 |
| 1,2-Propane diol: | 10.00 | | | 10.00 | |
| 1,2-Butane diol | | 10.00 | 10.00 | | |
| 2,3-Butane diol | | | | | 10.00 |
| 4-Methyl-2,4-pentanediol | | 10.00 | | | |
| 3-Methoxy-3-methyl-1-butanol | | | | | 10.00 |
| EMULGEN LS-106 | 1.00 | 0.70 | 1.00 | 1.00 | |
| FS-300: | | | | | 0.70 |
| Calcium acetate monohydrate | 1.76 | | | | |
| Sodium acetate (anhydride) | | | 2.72 | | |
| Magnesium sulfate (anhydride) | | 6.02 | | | 6.02 |
| Aluminum sulfate dodecahydrate | | | | 7.50 | |
| Ethylene-vinyl acetate resin (solid portion amount) | 10.00 | | | | |
| Ethylene-vinylacetate-vinyl chloride copolymer resin (solid portion amount) | | | | | 10.00 |
| Vinyl acetate-acrylic resin (solid portion amount) | | 20.00 | | | |
| Urethane resin (solid portion amount) | | | | 10.00 | |
| Styrene butadiene resin (solid portion amount) | | | | | 10.00 |
| Polyester resin (solid portion amount) | | | 10.00 | | |
| Cationic resin (solid portion amount) | | | | | |
| PROXEL LV | 0.10 | 0.10 | 0.10 | 0.10 | 0.10 |
| Water | 77.14 | 53.18 | 76.18 | 71.4 | 53.18 |
| Total (parts) | 100 | 100 | 100 | 100 | 100 |

| Component | Liquid composition for surface treatment | | | |
|---|---|---|---|---|
| | 6 | 7 | 8 | 9 |
| 1,2-Propane diol: | 10.00 | | 10.00 | 10.00 |
| 1,2-Butane diol | | 10.00 | | |
| 2,3-Butane diol | | | | |
| 4-Methyl-2,4-pentanediol | | 10.00 | | |
| 3-Methoxy-3-methyl-1-butanol | | | | |
| EMULGEN LS-106 | 1.00 | 1.00 | 1.00 | 1.00 |
| FS-300: | | | | |
| Calcium acetate monohydrate | | 1.76 | 1.76 | |
| Sodium acetate (anhydride) | | | | 2.72 |
| Magnesium sulfate (anhydride) | | | | |
| Aluminum sulfate dodecahydrate | 1.76 | | | |
| Ethylene-vinyl acetate resin (solid portion amount) | | | | |
| Ethylene-vinylacetate-vinyl chloride copolymer resin (solid portion amount) | | | | |
| Vinyl acetate-acrylic resin (solid portion amount) | | | | |
| Urethane resin (solid portion amount) | | 10.00 | | |
| Styrene butadiene resin (solid portion amount) | | | | |
| Polyester resin (solid portion amount) | 10.00 | | 10.00 | |
| Cationic resin (solid portion amount) | | | | 10.00 |
| PROXEL LV | 0.10 | 0.10 | 0.10 | 0.10 |
| Water | 77.14 | 67.14 | 77.14 | 76.18 |
| Total (parts) | 100 | 100 | 100 | 100 |

In Table 7, the details of the material used are as follows:
Urethane resin emulsion A was used as urethane resin and polyester resin emulsion A was used as polyester resin.

Preparation of Urethane Resin Emulsion A

To 1 mol of 1,6-hexanediol, 1.4 mol of dicyclohexylmethane diisocyanate, 0.1 mol of diisocyanate compound obtained by reaction of 1 mol of a trimer of isocyanulate of 1,6-hexamethylene diisocyanate and ⅓ mol of polyethylene glycol monomethyl ether having a molecular weight of 1,000, and 15 percent by mass N-methyl-2-pyrolidone were loaded in a reaction flask for reaction at 90 degrees C. for two hours in a nitrogen atmosphere to obtain a prepolymer.

450 g of the thus-obtained prepolymer composition having a solid portion of 85 percent by mass was dripped in 15 minutes to 600 g of water in which 0.2 g of silicone-based defoaming agent (SE-21, manufactured by Wacker Asahikasei Silicone Co., Ltd.) was dissolved. Subsequent to stirring at 25 degrees C. for 10 minutes, the compound represented by the Chemical structure I, ethylenediamine, and adipic acid dihydrazide were dripped to obtain a polyurethane resin emulsion A.

  Chemical structure I

Tg of the polyurethane resin emulsion A was measured by differential scanning calorimeter (DSC) (Thermo plus EV02/DSC, manufactured by Rigaku Corporation) and was 20 degrees C.

Preparation of Polyester Resin Emulsion A

First, 3.0 parts of hydroxyethyl cellulose (METOLOSE 60SH-50, manufactured by Shin-Etsu Chemical Co., Ltd.) and 30 parts of nonionic emulsifier (EMULGEN 1108, manufactured by Kao Corporation) in solid portion conversion were dissolved in 225 parts of water to prepare emulsifier aqueous solution.

Next, 150 parts of polylactic acid (VYLOECOL BE-450, manufactured by TOYOBO CO., LTD.) was dissolved in 300 parts of toluene in a reaction container equipped with a thermometer, a nitrogen introducing tube, a stirrer, and a condenser. Thereafter, the emulsifier aqueous solution was added and the resultant was stirred and mixed at 45 degrees C. for 30 minutes for preliminary emulsification.

The preliminary emulsified matter was emulsified under 300 k/m³ by a high pressure emulsifier (manufactured by Manton-Gaulin) to obtain a minute emulsified object.

This minute emulsified object was heated and distilled under a reduced pressure of 130 mmHg to remove toluene. Thereafter, the solid portion was adjusted to obtain a polyester emulsion having a solid portion of 45 percent, a pH of 2.4, and a particle diameter of 0.32 µm. Thereafter, pH was adjusted to 7.0 by 25 percent ammonium water.

0.6 parts of a thickening agent (PRIMAL™ ASE-60, manufactured by The Dow Chemical Company) was added to this polyester emulsion, which was adjusted to have a solid portion of 40 percent by mass to obtain a polyester resin emulsion A.

Tg of the polyester resin emulsion A was measured by differential scanning calorimeter (DSC) (Thermo plus EV02/DSC, manufactured by Rigaku Corporation) and was 0 degrees C.

The resin other than the above and shown in Tables were the following products available on the market.

Ethylene-vinyl acetate resin: SUMIKAFLEX® 951HQ, Tg of −25 degrees C., manufactured by Sumika Chemtex Company, Limited Ethylene-vinyl acetate-vinyl chloride copolymer resin: SUMIKAFLEX® 808HQ, Tg of 25 degrees C., manufactured by Sumika Chemtex Company, Limited Vinyl acetate-acrylic resin: Vinyblan 1225, Tg of 9 degrees C., manufactured by Nissin Chemical Industry Co., Ltd.

Styrenebutadiene resin: NALSTAR SR-130. Tg of −1 degrees C., manufactured by NIPPON A&L INC In addition, the cationic resins in Table 7 are as follows.

Cationic resin: ARROWBASE CB-1200 (polyolefin resin, manufactured by UNITIKA LTD.)

Next, properties of each obtained liquid composition and ink were evaluated in the following manner. The results are shown in Tables 8 to 10.

Evaluation on Stability of Liquid Composition for Surface Treatment

The thus-prepared liquid composition for surface treatment was placed in a sealed container and left still at 80 degrees C. in a hemathermal tank for two weeks to evaluate storage stability of the liquid composition for surface treatment from the viscosity change between before and after the storage.

Using a cone plate type rotatory viscometer (VISCOMETER TV-22, manufactured by TOKI SANGYO CO., LTD.), viscosity before and after the storage was measured to obtain change ratio of viscosity under such conditions that the temperature of the hemathermal cycling water was 25 degrees C., the number of rotation was 50 rpm, and the shearing speed was 191.4 sec⁻¹.

The change ratio was evaluated according to the following criteria and A and B were determined as allowable.

Evaluation Criteria

A: Change ratio of viscosity before and after storage from −10 percent to 10 percent B: Change ratio of viscosity before and after storage from −20 percent to less than −10 percent and more than 10 to 20 percent C: Change ratio of viscosity before and after storage from less than −20 percent to −30 percent and more than 20 to 30 percent Evaluation on Sedimentation of Ink Sedimentation property of the particle of each ink prepared in Examples 1 to 14 and Comparative Examples 1 to 9 was evaluated using turbiscan MA2000, manufactured by EKO Instruments.

Specifically, while water-cooling down the ink to be evaluated, the ink was subject to ultrasonic dispersion treatment (100W, 20 minutes) for uniform dispersion. Thereafter, 5.0 mL of the ink to be evaluated was charged in a special glass cell using a pipette. The ink was measured 30 minutes later at which the liquid level of the ink was stabilized. This point in time was determined as the start of sedimentation evaluation. Thereafter, the ink was left still at 23 degrees C. and kept measured until 100 hours later. Sedimentation was evaluated by deviation display based on the start of sedimentation evaluation used as reference. Sedimentation was evaluated according to the following criteria using quantity survey (relative value mode) of the peaks for changes of backscattered light due to production of supernatent and evaluated.

Evaluation Criteria

A: Relative change at 100 hours after the start of evaluation was less than 5.0 percent B: Relative change at 100 hours after the start of evaluation was from 5.0 to less than 10.0 percent C: Relative change at 100 hours after the start of evaluation was from 10.0 to less than 15.0 percent D: Relative change at 100 hours after the start of evaluation was 15.0 percent or greater Storage Stability of Ink An ink cartridge was loaded with each ink prepared in Examples 1 to 14 and Comparative Examples 1 to 9 and left at 50 degrees C. for three weeks. Using cone plate type rotatory viscometer (VISCOMETER TV-22, manufactured by TOKI SANGYO CO., LTD.), viscosity before and after the storage was measured to obtain change ratio of viscosity according to the following relation under the conditions that the temperature of the hemathermal cycling water was 25 degrees C., the number of rotation was 50 rpm, and the the shearing speed was 191.4 sec⁻¹. Thereafter, the change ratio was evaluated according to the following criteria.

Change ratio of viscosity (percent)=(Viscosity of ink after storage−Viscosity of ink before storage)/(Viscosity of ink before storage)×100 Relation Evaluation Criteria A: Change ratio of viscosity before and after storage within −5 percent to 5 percent B: Change ratio of viscosity before and after storage within −10 percent to less than −5 percent and more than 5 percent to 10 percent C: Change ratio of viscosity before and after storage within −15 percent to less than −10 percent and more than 10 percent to 15 percent D: Change ratio of viscosity before and after storage less than −15 percent or more than 15 percent Recording Condition The exterior of an inkjet printer (IPSiO GXe5500, manufactured by Ricoh Company Ltd.) was removed and multiple bypass feeders were attached to the rear of the inkjet printer. Pure water was caused to sufficiently flow in the ink supplying passage including the print head until the washing liquid was not colored. Thereafter, the washing liquid was completely drawn from the device to be ready for evaluation.

In addition, the prepared ink was stirred for 30 minutes under a reduced pressure of from 5 to 10 Pa to remove air from the ink to be evaluated. An ink cartridge was filled with the ink to be ready for evaluation.

After confirming that the ink cartridge was filled with the ink and all the nozzles were filled with the ink for evaluation and no defective images were produced, gloss and beautiful mode was selected by a driver installed onto the printer and thereafter color matching off was determined as print mode at user setting. To adjust the discharging amount, the drive voltage of the head was changed in order that the attached amount of the ink of a solid image on a recording medium was 20 g/m$^2$.

Evaluation on Chemical Resistance

An inkjet printer (IPSiO GXe5500, manufactured by Ricoh Company Ltd.) was filled with the ink prepared in Examples 3, 6, and 10 to 13, and Comparative Example 1, 2, and 5 to 8, and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried in a hemathermal tank at 100 degrees C. for 60 minutes.

The inkjet printer (IPSiO GXe5500, manufactured by Ricoh Company Ltd.) was filled with the ink prepared in Examples 1, 2, 4, 5, and 7 to 9, and Comparative Example 3 and 4 and a solid image of 50 cm×50 cm created by Microsoft Word 2003 was printed on a transparent PET film (ester film: E5100, manufactured by TOYOBO CO., LTD.) to which the liquid composition for surface treatment shown in Table 8 was preliminarily applied by a bar coater (winding diameter of 0.10 mm) and dried and which was fixed on MyPaper (PPC plain paper, manufactured by Ricoh Company Ltd.) with double-sided adhesive tape. Thereafter, the solid image was dried in a thermal tank at 100 degrees C. for 60 minutes.

The solid image portion was abraded by a cotton applicator impregnated in an aqueous solution containing 49 percent by mass of ethanol and 1 percent by mass of methylethyl ketone 20 times. The chemical resistance of the solid image was evaluated based on the degree of peeling-off according to the following criteria.

Evaluation Criteria

A: No peeling-off in solid image portion, no contamination on cotton applicator

B: No peeling-off in solid image portion but slight contamination observed on cotton applicator C: Ink melted portion observed on solid image portion Evaluation on Scratch Resistance The inkjet printer (IPSiO GXe5500, manufactured by Ricoh Company Ltd.) was filled with the ink prepared in Examples 3, 6, and 10 to 13, and Comparative Example 1, 2, and 5 to 8 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried in a hemathermal tank at 100 degrees C. for 60 minutes.

The inkjet printer (IPSiO GXe5500, manufactured by Ricoh Company Ltd.) was filled with the ink prepared in Examples 1, 2, 4, 5, and 7 to 9, and Comparative Example 3 and 4 and a solid image of 50 cm×50 cm created by Microsoft Word 2003 was printed on a transparent PET film (ester film: E5100, manufactured by TOYOBO CO., LTD.) to which the liquid composition for surface treatment shown in Table 8 was preliminarily applied by a bar coater (winding diameter of 0.10 mm) and dried and which was fixed on MyPaper (PPC plain paper, manufactured by Ricoh Company Ltd.) with double-sided adhesive tape. Thereafter, the solid image was dried in a hemathermal tank at 100 degrees C. for 60 minutes.

Thereafter, the solid portion was abraded by dried cotton (unbleached muslin No. 3) under a load of 400 g and evaluated about abrasion (friction) resistance according to the following criteria. A and B are allowable.

Evaluation Criteria

A: No change in image when abraded 100+ times

B: Slight scratch observed when abraded 100 times but causing no impact on image density C: Image density degraded when abraded 100− times D: Image density degraded when abraded 50− times Discharging Stability An inkjet printer (IPSiO GXe5500, manufactured by Ricoh Co., Ltd.) having a cover was filled with the ink prepared in Examples 1 to 14 and Comparative Examples 1 to 9 and left at 10 degrees C. and 15 percent RH for one week with the cover closed. Thereafter, a nozzle checking pattern was printed and visually observed to check non-discharging and disturbance of discharging for evaluation according to the following evaluation criteria.

Evaluation Criteria

A: No non-discharging or no disturbance at all

B: Slight discharging disturbance

C: One or more nozzles failed to discharge

D: Multiple nozzles with non-discharging confirmed

Evaluation on Concealing Property

Lightness Evaluation of Print Image

An inkjet printer (IPSiO GXe5500, manufactured by Ricoh Company Ltd.) was filled with the ink prepared in Examples 3, 6, and 10 to 13, Comparative Example Examples 1, 2, and 5 to 8 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried in a hemathermal tank at 100 degrees C. for 60 minutes.

The inkjet printer (IPSiO GXe5500, manufactured by Ricoh Company Ltd.) was filled with the ink prepared in Examples 1, 2, 4, 5, and 7 to 9, and Comparative Example 3 and 4 and a solid image of 50 cm×50 cm created by Microsoft Word 2003 was printed on a transparent PET film (ester film: E5100, manufactured by TOYOBO CO., LTD.) to which the liquid composition for surface treatment shown in Table 8 was preliminarily applied by a bar coater (winding diameter of 0.10 mm) and dried and which was fixed on MyPaper (PPC plain paper, manufactured by Ricoh Company Ltd.) with double-sided adhesive tape. Thereafter, the solid image was dried in a hemathermal tank at 50 degrees C. for 60 minutes.

Placing a black sheet available on the market under the PET film on which the image was printed, the lightness (L*50° C.) of the printed portion was measured using a spectrodensitometer (X-Rite 939, manufactured by X-Rite) and evaluated according to the following evaluation criteria.
Evaluation Criteria
  A: L*50° C. value is 70 or greater
  B: L*50° C. value is 60 to less than 70
  C: L*50° C. value is less than 60.

As reference, the L*50° C. value was measured while a PET film having no printed portion thereon was placed on black paper. It was 23.

Whiteness Stability of Printed Image

The inkjet printer (IPSiO GXe5500, manufactured by Ricoh Company Ltd.) was filled with the ink prepared in Examples 3, 6, and 10 to 13, and Comparative Example 1, 2, and 5 to 8 and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried in a hemathermal tank at 100 degrees C. for 60 minutes.

The inkjet printer (IPSiO GXe5500, manufactured by Ricoh Company Ltd.) was filled with the ink prepared in Examples 1, 2, 4, 5, and 7 to 9, and Comparative Example 3 and 4 and a solid image of 50 cm×50 cm created by Microsoft Word 2003 was printed on a transparent PET film (ester film: E5100, manufactured by TOYOBO CO., LTD.) to which the liquid composition for surface treatment shown in Table 8 was preliminarily applied by a bar coater (winding diameter of 0.10 mm) and dried and which was fixed on MyPaper (PPC plain paper, manufactured by Ricoh Company Ltd.) with double-sided adhesive tape. Thereafter, the solid image was dried in a hemathermal tank at 100 degrees C. for 60 minutes.

Thereafter, lightness of the recording medium dried in a hemathermal tank at 50 degrees C. for one hour and the recording medium dried in a hemathermal tank at 100 degrees C. for one hour was measured. The absolute value of the lightness difference |ΔL*|=|(L*50° C.)−(L*100° C.) was calculated and evaluated.

Placing a black sheet available on the market under the PET film on which the solid image was printed, the printed portion was measured using a spectrodensitometer (X-Rite 939, manufactured by X-Rite) and evaluated according to the following evaluation criteria.
Evaluation Criteria
  A: |ΔL*| value is less than 5
  B: |ΔL*| value is 5 to less than 10
  C: |ΔL*| value is 10 or greater Evaluation of Lightness of Image (Temperature Dependency)

An inkjet printer (IPSiO GXe5500, manufactured by Ricoh Company Ltd.) was filled with the solvent ink prepared in Example 14 and Comparative Example 9, and a solid image of 50 cm×50 cm created by Microsoft Word 2003 was printed on a transparent PET film (ester film: E5100, manufactured by TOYOBO CO., LTD.) fixed on MyPaper (PPC plain paper, manufactured by Ricoh Company Ltd.) with double-sided adhesive tape.

Lightness L* was measured for each of the recording medium dried in a hemathermal tank at 50 degrees C. for one hour, the recording medium dried in a hemathermal tank at 100 degrees C. for one hour, and the recording medium dried in a hemathermal tank at 150 degrees C. for one hour and evaluated according to the following criteria.
Evaluation Criteria
  A: L* value is 70 or greater
  B: L* value is 60 to less than 70
  A: L* value is less than 60.

TABLE 8

| Example/ Comparative Example No. | Ink | Particle | Liquid composition for surface treatment | Evaluation on ink sedimentation Relative change | Rate | Ink storage stability Rate |
|---|---|---|---|---|---|---|
| Aqueous ink | | | | | | |
| Example 1 | Ink 1 | Inorganic hollow particle 1 | Liquid composition 1 | 1.6 | A | B |
| Example 2 | Ink 2 | Inorganic hollow particle 2 | Liquid composition 2 | 1.3 | A | B |
| Example 3 | Ink 3 | Inorganic hollow particle 3 | — | 1.2 | A | B |
| Example 4 | Ink 4 | Inorganic hollow particle 4 | Liquid composition 3 | 1.7 | A | A |
| Example 5 | Ink 5 | Inorganic hollow particle 5 | Liquid composition 4 | 2.2 | A | B |
| Example 6 | Ink 6 | Inorganic hollow particle 6 | — | 2.3 | A | A |

TABLE 8-continued

| Example/Comparative Example No. | Ink | Particle | Liquid composition | | | |
|---|---|---|---|---|---|---|
| Example 7 | Ink 7 | Inorganic hollow particle 7 | Liquid composition 5 | 4.3 | A | A |
| Example 8 | Ink 8 | Inorganic hollow particle 8 | Liquid composition 6 | 7.8 | B | B |
| Example 9 | Ink 9 | Inorganic hollow particle 9 | Liquid composition 7 | 8.5 | B | B |
| Example 10 | Ink 10 | Inorganic hollow particle 10 | — | 9.9 | B | B |
| Example 11 | Ink 11 | Inorganic hollow particle 9 | — | 7.1 | B | A |
| Example 12 | Ink 12 | Inorganic hollow particle 7 | — | 4.2 | A | B |
| Example 13 | Ink 13 | Inorganic hollow particle 14 | — | 5.2 | B | B |
| Comparative Example 1 | Ink 15 | SiliNax | — | 0.8 | A | C |
| Comparative Example 2 | Ink 16 | Inorganic hollow particle 11 | — | 3.2 | A | B |
| Comparative Example 3 | Ink 17 | Inorganic hollow particle 12 | Liquid composition 8 | 1.1 | A | B |
| Comparative Example 4 | Ink 18 | Inorganic hollow particle 13 | Liquid composition 9 | 2.1 | A | B |
| Comparative Example 5 | Ink 19 | Hollow resin particle | — | 0.7 | A | D |
| Comparative Example 6 | Ink 20 | Hollow resin particle | — | 0.7 | A | D |
| Comparative Example 7 | Ink 21 | Titanium Oxide | — | 18 | D | A |
| Comparative Example 8 | Ink 23 | Inorganic hollow particle 1 | — | 1.6 | A | B |
| Solvent ink | | | | | | |
| Example 14 | Ink 14 | Inorganic hollow particle 7 | — | 3.5 | A | B |
| Comparative Example 9 | Ink 22 | Hollow resin particle | — | 1.1 | A | D |

| Example/Comparative Example No. | Ink | Particle | Stability Liquid composition for surface treatment Rate | Evaluation on Concealing Property | | | | |
|---|---|---|---|---|---|---|---|---|
| | | | | Lightness | | Lightness stability | | |
| | | | | L*50° C. | Rate | L*100° C. | \|ΔL*\| | Rate |
| Aqueous ink | | | | | | | | |
| Example 1 | Ink 1 | Inorganic hollow particle 1 | A | 61 | B | 61 | 0 | A |
| Example 2 | Ink 2 | Inorganic hollow particle 2 | B | 62 | B | 62 | 0 | A |
| Example 3 | Ink 3 | Inorganic hollow particle 3 | — | 64 | B | 63 | 1 | A |
| Example 4 | Ink 4 | Inorganic hollow particle 4 | A | 69 | B | 69 | 0 | A |
| Example 5 | Ink 5 | Inorganic hollow particle 5 | B | 72 | A | 72 | 0 | A |
| Example 6 | Ink 6 | Inorganic hollow particle 6 | — | 69 | B | 69 | 0 | A |

TABLE 8-continued

| Example 7 | Ink 7 | Inorganic hollow particle 7 | B | 76 | A | 75 | 1 | A |
|---|---|---|---|---|---|---|---|---|
| Example 8 | Ink 8 | Inorganic hollow particle 8 | A | 77 | A | 77 | 0 | A |
| Example 9 | Ink 9 | Inorganic hollow particle 9 | A | 78 | A | 77 | 1 | A |
| Example 10 | Ink 10 | Inorganic hollow particle 10 | — | 73 | A | 75 | 2 | A |
| Example 11 | Ink 11 | Inorganic hollow particle 9 | — | 71 | A | 71 | 0 | A |
| Example 12 | Ink 12 | Inorganic hollow particle 7 | — | 61 | B | 72 | 11 | A |
| Example 13 | Ink 13 | Inorganic hollow particle 14 | — | 74 | A | 75 | 1 | A |
| Comparative Example 1 | Ink 15 | SiliNax | — | 57 | C | 58 | 1 | A |
| Comparative Example 2 | Ink 16 | Inorganic hollow particle 11 | — | 49 | C | 49 | 0 | A |
| Comparative Example 3 | Ink 17 | Inorganic hollow particle 12 | A | 58 | C | 58 | 0 | A |
| Comparative Example 4 | Ink 18 | Inorganic hollow particle 13 | C | 59 | C | 59 | 0 | A |
| Comparative Example 5 | Ink 19 | Hollow resin particle | — | 70 | A | 49 | 21 | C |
| Comparative Example 6 | Ink 20 | Hollow resin particle | — | 65 | B | 47 | 18 | C |
| Comparative Example 7 | Ink 21 | Titanium Oxide | — | 70 | A | 70 | 0 | A |
| Comparative Example 8 | Ink 23 | Inorganic hollow particle 1 | A | 58 | C | 57 | 1 | A |

Solvent ink

| Example 14 | Ink 14 | Inorganic hollow particle 7 | — | 61 | B | 70 | 9 | B |
|---|---|---|---|---|---|---|---|---|
| Comparative Example 9 | Ink 22 | Hollow resin particle | — | 64 | B | 45 | 19 | C |

| Example/Comparative Example No. | Ink | Particle | Chemical resistance Rate | Scratch resistance Rate | Discharging stability Rate |
|---|---|---|---|---|---|
| Aqueous ink | | | | | |
| Example 1 | Ink 1 | Inorganic hollow particle 1 | A | A | A |
| Example 2 | Ink 2 | Inorganic hollow particle 2 | A | B | A |
| Example 3 | Ink 3 | Inorganic hollow particle 3 | A | B | B |
| Example 4 | Ink 4 | Inorganic hollow particle 4 | A | A | A |
| Example 5 | Ink 5 | Inorganic hollow particle 5 | A | B | B |
| Example 6 | Ink 6 | Inorganic hollow particle 6 | A | B | A |
| Example 7 | Ink 7 | Inorganic hollow particle 7 | A | A | A |

TABLE 8-continued

| | | | | | |
|---|---|---|---|---|---|
| Example 8 | Ink 8 | Inorganic hollow particle 8 | A | B | B |
| Example 9 | Ink 9 | Inorganic hollow particle 9 | A | A | B |
| Example 10 | Ink 10 | Inorganic hollow particle 10 | A | B | B |
| Example 11 | Ink 11 | Inorganic hollow particle 9 | A | B | A |
| Example 12 | Ink 12 | Inorganic hollow particle 7 | A | B | A |
| Example 13 | Ink 13 | Inorganic hollow particle 14 | A | B | B |
| Comparative Example 1 | Ink 15 | SiliNax | A | B | D |
| Comparative Example 2 | Ink 16 | Inorganic hollow particle 11 | A | B | C |
| Comparative Example 3 | Ink 17 | Inorganic hollow particle 12 | A | C | C |
| Comparative Example 4 | Ink 18 | Inorganic hollow particle 13 | A | B | C |
| Comparative Example 5 | Ink 19 | Hollow resin particle | C | B | A |
| Comparative Example 6 | Ink 20 | Hollow resin particle | C | B | A |
| Comparative Example 7 | Ink 21 | Titanium Oxide | A | B | B |
| Comparative Example 8 | Ink 23 | Inorganic hollow particle 1 | A | D | B |
| Solvent ink | | | | | |
| Example 14 | Ink 14 | Inorganic hollow particle 7 | — | — | B |
| Comparative Example 9 | Ink 22 | Hollow resin particle | — | — | D |

TABLE 9

| | | | Liquid composition for surface | Concealing property (temperature dependency) | | | | | |
|---|---|---|---|---|---|---|---|---|---|
| | Ink | Particle | treatment | L*50° C. | Rate | L*100° C. | Rate | L*150° C. | Rate |
| Example 14 | Ink 14 | Inorganic hollow particle 7 | — | 61 | B | 70 | A | 72 | A |
| Comparative Example 9 | Ink 22 | Hollow resin particle | — | 64 | B | 45 | C | 32 | C |

Images were formed in the same manner as in Example 7 except that an inkjet printer was used in which the drive voltage of the head was changed to adjust the attachment amount of ink to 12 g/m$^2$ and 16 g/m$^2$ to evaluate the concealing property.

Example in which the attachment amount of ink was 12 g/m$^2$ is numbered as Example 7-2 and Example 7-3 in which the attachment amount of ink was 16 g/m$^2$ is numbered as Example 7-3. The results of those are shown in Table 10 together with the result of Example 7.

TABLE 10

|  | Ink | Particle | Liquid composition for surface treatment | Attachment amount of ink g·m² | Evaluation on concealing property | | | | |
|---|---|---|---|---|---|---|---|---|---|
|  |  |  |  |  | Lightness | | Lightness stability | | |
|  |  |  |  |  | L*50° C. | Rate | L*100° C. | \|ΔL*\| | Rate |
| Examples 7-2 | Ink 7 | Inorganic hollow particle 7 | Liquid composition 5 | 12 | 67 | B | — | — | — |
| Examples 7-3 | Ink 7 | Inorganic hollow particle 7 | Liquid composition 5 | 16 | 71 | A | — | — | — |
| Example 7 | Ink 7 | Inorganic hollow particle 7 | Liquid composition 5 | 20 | 76 | A | 75 | 1 | A |

In addition, no liquid composition for surface treatment was used for each ink of Examples 1, 2, 4, 5, and 7 to 9 and Comparative Examples 3 and 4 and a solid image was printed in the same manner as in Example 3 on a transparent PET film (ester film: E5100, manufactured by TOYOBO CO., LTD.) fixed on MyPaper (PPC plain paper, manufactured by Ricoh Company Ltd.) with double-sided adhesive tape. Thereafter, the solid image was dried, and lightness (L*50° C.), lightness (L*100° C.), and the absolute difference of lightness |ΔL*| was calculated to evaluate concealing property.

The results are shown in Table 11.

TABLE 11

| Example Comparative Example No. | Ink | Evaluation on Concealing Property | | | | |
|---|---|---|---|---|---|---|
|  |  | Lightness | | Lightness stability | | |
|  |  | L*50° C. | Rate | L*100° C. | \|ΔL*\| | Rate |
| Example 1 | Ink 1 | 60 | B | 60 | 0 | A |
| Example 2 | Ink 2 | 60 | B | 60 | 0 | A |
| Example 4 | Ink 4 | 68 | B | 68 | 0 | A |
| Example 5 | Ink 5 | 70 | A | 70 | 0 | A |
| Example 7 | Ink 7 | 75 | A | 74 | 1 | A |
| Example 8 | Ink 8 | 75 | A | 75 | 0 | A |
| Example 9 | Ink 9 | 77 | A | 76 | 1 | A |
| Comparative Example 3 | Ink 17 | 57 | C | 57 | 0 | A |
| Comparative Example 4 | Ink 18 | 58 | C | 58 | 0 | A |

As seen in the results, Examples 1 to 14 in which the inorganic hollow particle has a spherical form are evaluated better than Comparative Examples 1 to 8 with regard to discharging stability, sedimentation, concealing property, and chemical resistance. Sedimentation evaluation results are good. Accordingly, no settling out occurred so that dispersion stability was conformed to be good. Concealing property was enhanced due to agglomeration effect in the recording method using the liquid compositions for surface treatment in combination as seen in Examples 1, 2, 4, 5, and 7 to 9.

Conversely, as seen in Comparative Examples 1 to 4, discharging stability is significantly inferior in the case of non-spherical inorganic hollow particles. Moreover, in Comparative Examples 5 and 6, hollow resin particles were used. This invited very poor whiteness stability for the concealing property evaluation. This is considered to be because when the ink medium evaporates during drying, the easily-soluble components are condensed since the evaporation speed of the solvent having a high boiling point is slow, so that the resin backbone forming hollow portions is dissolved. This is inferred to be true to the solvent ink in Comparative Example 9.

Moreover, when titanium oxide is used as in Comparative Example 7, specific gravity is large, which invites easy sedimentation. As seen in the case of Example 12 and Comparative Example 6, when a solvent having a high boiling point is included, the solvent component easily remains in hollow particles, which invites a slightly low degree of whiteness. However, in Example 12, good degree of whiteness is confirmed to be obtained under severe drying conditions.

According to the present disclosure, an ink is provided which has both high level of dispersion stability and discharging stability and excellent concealing property.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
   a volatile solvent;
   a pigment comprising an inorganic hollow particle having a spherical form; and
   a resin particle,
   wherein the inorganic hollow particle has a number average primary particle diameter of at least 300 nm.

2. The ink according to claim 1,
   wherein the inorganic hollow particle has a number average primary particle diameter of from 300 to 550 nm.

3. The ink according to claim 1,
   wherein the inorganic hollow particle has an outer shell having a thickness of from 15 to 50 nm.

4. The ink according to claim 1,
   wherein the inorganic hollow particle accounts for 3 to 10 percent by mass of the ink.

5. The ink according to claim 1,
   wherein the volatile solvent comprises a non-polymerizable solvent having a boiling point of 260 degrees C. or lower.

6. The ink according to claim 1, wherein the volatile solvent comprises water.

7. The ink according to claim 6, wherein the volatile solvent further comprises a water-soluble organic solvent.

8. The ink according to claim 1, wherein the volatile solvent comprises an organic solvent.

9. The ink according to claim 1,
wherein the resin particle comprises at least one member selected from the group consisting of a polyurethane resin, a polyester resin, an acrylic resin, and a vinyl chloride resin.

10. The ink according to claim 1,
wherein an absolute lightness difference $|\Delta L^*|$ between $L^*50°$ C. and $L^*100°$ C. of a solid image of 50 mm ×50 mm formed on a polyethylene terephthalate (PET) film satisfies the following relation:

$$|\Delta L^*|=|L^*100° \text{ C.}-L^*50° \text{ C.}|\leq 10,$$

where $L^*50°$ C. and $L^*100°$ C. respectively represent a lightness $L^*$ after the solid image is dried in a hemathermal tank for one hour at 50 degrees C. and 100 degrees C.

11. The ink according to claim 1,
wherein the inorganic hollow particle has an average circularity of 0.93 or greater.

12. The ink according to claim 1,
wherein the inorganic hollow particle has an average circularity of 0.95 or greater.

13. The ink according to claim 1,
wherein the inorganic hollow particle has the number average primary particle diameter of at least 310 nm.

14. The ink according to claim 1,
wherein the inorganic hollow particle has the number average primary particle diameter of 510 nm to 550 nm.

15. An ink accommodating unit comprising:
the ink of claim 1; and
a container configured to accommodate the ink of claim 1.

16. A recording method comprising:
jetting the ink of claim 1 to form an image on a recording medium; and
drying the image at a temperature range of from 50 to 200 degrees C.

17. A recording method comprising:
attaching a liquid composition for surface treatment and the ink of claim 1 to a recording medium,
wherein the liquid composition comprises a multivalent metal salt.

18. The recording method according to claim 17,
wherein the liquid composition further comprises a non-ionic resin particle comprising at least one member selected from the group consisting of a polyolefin resin, a polyvinyl acetate resin, a polyvinyl chloride resin, a urethane resin, a styrene butadiene resin, and copolymers thereof,
wherein the multivalent metal salt comprises at least one member selected from the group consisting a calcium salt, a magnesium salt, a nickel salt, and an aluminum salt.

19. A recording device comprising:
the ink accommodating unit of claim 15; and
a discharging head configured to discharge the ink.

20. Recorded matter comprising:
a recording medium on which a print layer is formed,
wherein the print layer is formed from the ink of claim 1.

* * * * *